(12) United States Patent
Arakane

(10) Patent No.: US 10,583,658 B2
(45) Date of Patent: Mar. 10, 2020

(54) INKJET RECORDING APPARATUS, COMPUTER-READABLE STORAGE MEDIUM, AND SYSTEM

(71) Applicant: BROTHER KOGYO KABUSHIKI KAISHA, Nagoya-shi, Aichi-ken (JP)

(72) Inventor: Satoru Arakane, Aichi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/921,060

(22) Filed: Mar. 14, 2018

(65) Prior Publication Data

US 2019/0001668 A1 Jan. 3, 2019

(30) Foreign Application Priority Data

Jun. 30, 2017 (JP) ................. 2017-128429

(51) Int. Cl.
*B41J 2/045* (2006.01)
*B41J 2/165* (2006.01)
(Continued)

(52) U.S. Cl.
CPC ....... *B41J 2/16505* (2013.01); *B41J 2/04573* (2013.01); *B41J 2/04581* (2013.01); *B41J 2/16508* (2013.01); *B41J 2/16511* (2013.01); *B41J 2/16517* (2013.01); *B41J 2/16526* (2013.01); *B41J 29/02* (2013.01); *B41J 29/13* (2013.01); *B41J 29/38* (2013.01);
(Continued)

(58) Field of Classification Search
CPC . B41J 2/04573; B41J 2/04581; B41J 2/16505
See application file for complete search history.

(56) References Cited

U.S. PATENT DOCUMENTS

2002/0085062 A1* 7/2002 Ide .................. B41J 2/16544
347/33
2004/0184081 A1 9/2004 Yamamoto
(Continued)

FOREIGN PATENT DOCUMENTS

| JP | 3258633 B2 | 2/2002 |
|---|---|---|
| JP | 2016-212786 A | 12/2016 |
| JP | 2017-182523 A | 10/2017 |

*Primary Examiner* — Alessandro V Amari
*Assistant Examiner* — Kendrick X Liu
(74) *Attorney, Agent, or Firm* — Merchant & Gould P.C.

(57) ABSTRACT

An inkjet recording apparatus, including a recording head with a nozzle, a cap, a moving mechanism to move at least one of the recording head and the cap, a communication interface, and a controller, is provided. In response to receipt of a preceding command from an information processing terminal through the communication interface, the controller determines a standby period based on a parameter being in correlation with a receiving interval between a preceding command and a record command. In response to elapse of the determined standby period, the controller controls the moving mechanism to uncap the recording head. In response to receipt of the record command from the information processing terminal, and in response to completion of the uncapping, the controller controls the recording head in accordance with the record command to discharge the ink from the nozzle to record the image on a medium.

10 Claims, 13 Drawing Sheets

(51) Int. Cl.
*G06K 15/10* (2006.01)
*B41J 29/393* (2006.01)
*G06F 3/12* (2006.01)
*B41J 29/13* (2006.01)
*B41J 29/38* (2006.01)
*B41J 29/02* (2006.01)

(52) U.S. Cl.
CPC .......... *B41J 29/393* (2013.01); *G06F 3/1296* (2013.01); *G06K 15/102* (2013.01); *B41J 2002/16573* (2013.01)

(56) References Cited

U.S. PATENT DOCUMENTS

2004/0246293 A1* 12/2004 Sanpei .................. B41J 2/14274
  347/22
2016/0337542 A1  11/2016 Oguchi
2017/0289380 A1  10/2017 Oguchi et al.

* cited by examiner

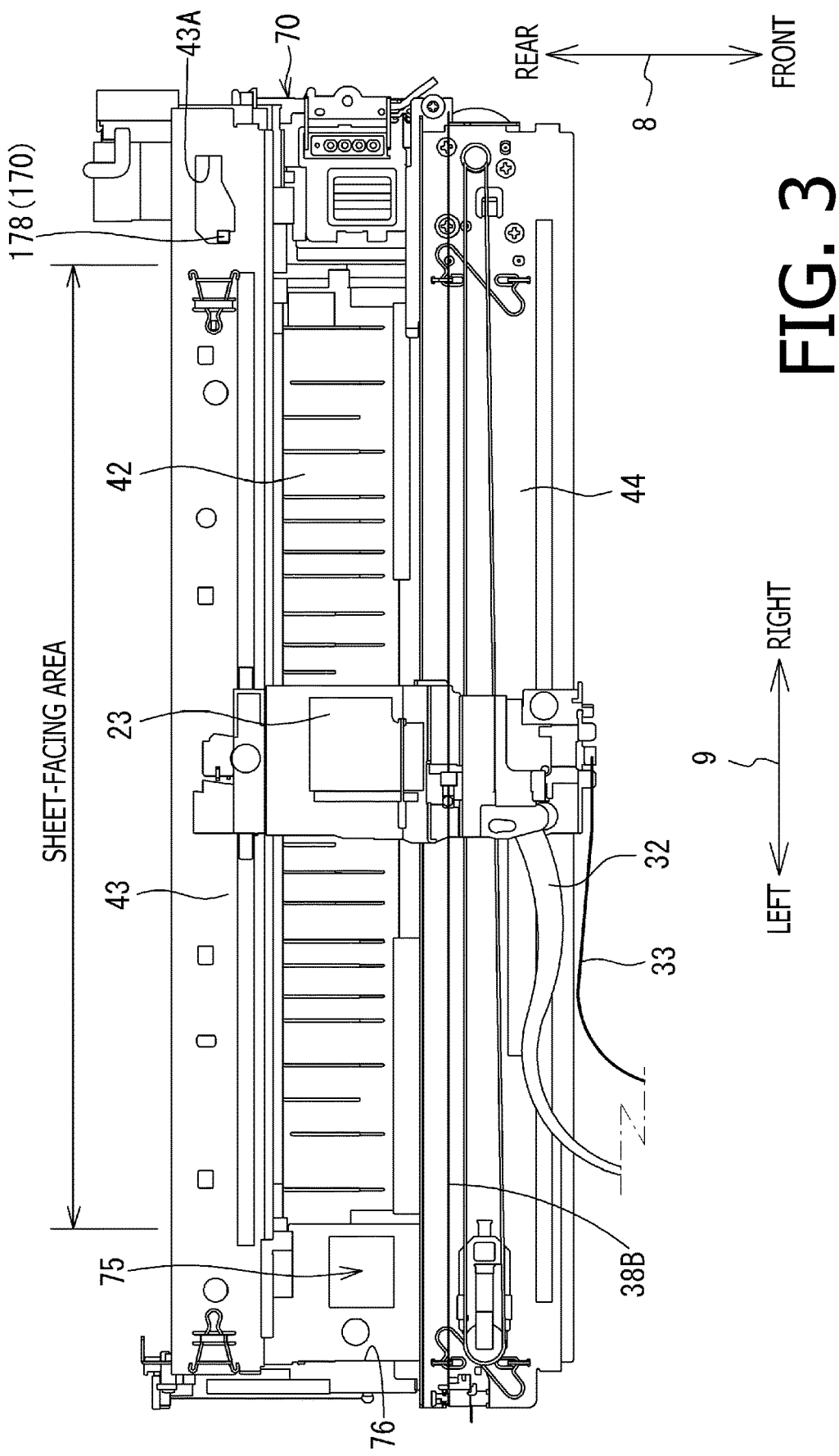

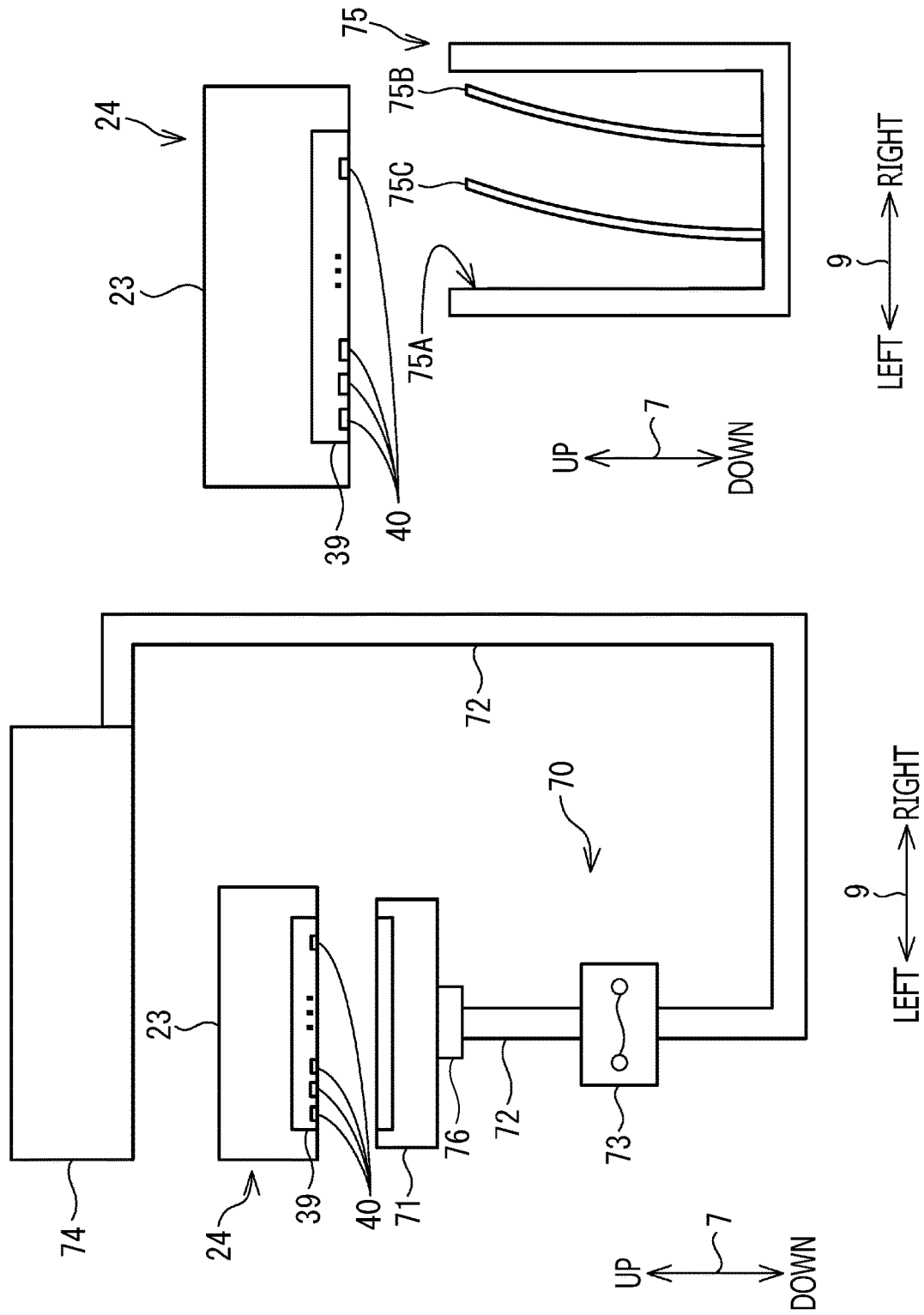

INKJET RECORDING APPARATUS, COMPUTER-READABLE STORAGE MEDIUM, AND SYSTEM

CROSS REFERENCE TO RELATED APPLICATION

This application claims priority under 35 U.S.C. § 119 from Japanese Patent Application No. 2017-128429, filed on Jun. 30, 2017, the entire subject matter of which is incorporated herein by reference.

BACKGROUND

Technical Field

The present disclosure is related to one or more aspects of an inkjet recording apparatus capable of recording an image on a sheet.

Related Art

An information processing terminal and a printer may often be connected with each other through a communication network so that an instruction to print an image on a sheet may be transmitted from the information processing terminal to the printer, and the printer receiving the instruction may print the image on a sheet. Concerning such a printable system, attempts have been made to shorten First Print Out Time (FPOT), which is a length of time between input of the instruction to the printer and discharge of the sheet with the printed image thereon from the printer.

One of the attempts may be found in, for example, a printer, which may start a preparatory action in response to receipt of preceding data, and record an image in response to receipt of job data following the preceding data. The preparatory action may include, for example, when the printer is an inkjet printer equipped with a cap that covers nozzles of a recording head to prevent ink in the nozzles from drying, uncapping, i.e., separating the cap from the recording head.

SUMMARY

The length of time between input of a print instruction to the printer and discharge of a printed sheet from the printer in the above-mentioned printer may vary on a print job basis. That is, for the longer time period the receipt of the preceding data and the receipt of the job data are apart, for the longer time period it may take after completion of the preparatory action before an image recording action starts. In this regard, if the preparatory action includes the uncapping action, the nozzles may be exposed to the air while the cap may be separated from the recording head for the longer time period; therefore, the ink in the recording head may dry, and an image recording quality in the printer may be lowered.

An aspect of the present disclosure is advantageous in that an inkjet recording apparatus, in which an image recording quality may be restrained from lowering, and the FPOT may be shortened, is provided.

According to an aspect of the present disclosure, an inkjet recording apparatus, including a recording head having a nozzle for discharging ink; a cap configured to cover the nozzle; a moving mechanism configured to move at least one of the recording head and the cap to shift positional relation between the recording head and the cap, between a covered state, in which the nozzle is covered by the cap contacting the recording head, and a separated state, in which the recording head and the cap are separated from each other; a communication interface; and a controller, is provided. The controller is configured to, in response to receipt of a preceding command notifying upcoming transmission of a record command, the record command being an instruction to the inkjet recording apparatus to record an image on a medium, from an information processing terminal through the communication interface, determine a standby period based on a parameter being in correlation with a receiving interval between receipt of the preceding command and receipt of the record command; in response to elapse of the determined standby period, control the moving mechanism to uncap the recording head by shifting the positional relation between the recording head and the cap from the covered state to the separated state; and in response to receipt of the record command notified in the preceding command from the information processing terminal through the communication interface, and in response to completion of the uncapping, control the recording head in accordance with the record command to discharge the ink from the nozzle to record the image on the medium.

According to another aspect of the present disclosure, an inkjet recording apparatus, including a recording head having a nozzle for discharging ink; a cap configured to cover the nozzle; a moving mechanism configured to move at least one of the recording head and the cap to shift positional relation between the recording head and the cap, between a covered state, in which the nozzle is covered by the cap contacting the recording head, and a separated state, in which the recording head and the cap are separated from each other; a communication interface; and a controller, is provided. The communication interface includes a wired communication interface configured to communicate with an information processing terminal through a cable, and a wireless communication interface configured to wirelessly communicate with the information processing terminal. The controller is configured to, in response to receipt of a preceding command notifying upcoming transmission of a record command, the record command being an instruction to the inkjet recording apparatus to record an image on a medium, from the information processing terminal through the communication interface, determine a standby period; in response to elapse of the determined standby period, control the moving mechanism to uncap the recording head by shifting the positional relation between the recording head and the cap from the covered state to the separated state; and in response to receipt of the record command notified in the preceding command from the information processing terminal through the communication interface, and in response to completion of the uncapping, control the recording head in accordance with the record command to discharge the ink from the nozzle to record the image on the medium. The controller determines the communication interface, through which the preceding command was received, between the wired communication interface and the wireless communication interface. In response to a determination that the preceding command was received through the wired communication interface, the controller determines a first period as the standby period. In response to a determination that the preceding command was received through the wireless communication interface, the controller determines a second period being longer than the first period as the standby period.

According to another aspect of the present disclosure, a non-transitory computer readable medium storing computer readable instructions that are executable by a computer in an information processing terminal having an operation interface and a communication interface, the communication interface being configured to communicate with a recording apparatus, is provided. The computer readable instructions, when executed by the computer, cause the computer to, in response to receipt of an operation by a user to appoint image data through the operation interface, determine a standby period based on a parameter being in correlation with an receiving interval between receipt of a preceding command and receipt of a record command in the recording apparatus, the preceding command notifying upcoming transmission of the record command to the recording apparatus, and the record command being an instruction to the recording apparatus to record an image expressed in the image data on a medium; generate the record command from the image data; in response to elapse of the determined standby period, transmit the preceding command to the recording apparatus through the communication interface; and in response to completion of the generating of the record command, transmit the record command to the recording apparatus through the communication interface.

According to another aspect of the present disclosure, a system, including an information processing terminal and an inkjet recording apparatus, is provided. The information processing terminal has an operation interface, a first communication interface, and a first controller. The inkjet recording apparatus has a recording head including a nozzle for discharging ink; a cap configured to cover the nozzle; a moving mechanism configured to move at least one of the recording head and the cap to shift positional relation between the recording head and the cap, between a covered state, in which the nozzle is covered by the cap contacting the recording head, and a separated state, in which the recording head and the cap are separated from each other; a second communication interface; and a second controller. The first controller is configured to, in response to receipt of an operation by a user to appoint image data through the operation interface, transmit a preceding command notifying upcoming transmission of a record command to the inkjet recording apparatus through the first communication interface, the record command being an instruction to the inkjet recording apparatus to record an image expressed in the image data on a medium; generate the record command from the image data; and in response to completion of the generating of the record command, transmit the record command to the inkjet recording apparatus through the first communication interface. The second controller is configured to, in response to receipt of the preceding command from the information processing terminal through the second communication interface, determine a standby period based on a parameter being in correlation with an receiving interval between receipt of the preceding command and receipt of the record command; in response to elapse of the determined standby period, control the moving mechanism to uncap the recording head by shifting the positional relation between the recording head and the cap from the covered state to the separated state; and in response to receipt of the record command notified in the preceding command from the information processing terminal through the second communication interface, and in response to completion of the uncapping, control the recording head in accordance with the record command to discharge the ink from the nozzle to record the image on the medium.

According to another aspect of the present disclosure, a system, including an information processing terminal and an inkjet recording apparatus is provided. The information processing terminal has an operation interface, a first communication interface, and a first controller. The inkjet recording apparatus has a recording head including a nozzle for discharging ink; a cap configured to cover the nozzle; a moving mechanism configured to move at least one of the recording head and the cap to shift positional relation between the recording head and the cap, between a covered state, in which the nozzle is covered by the cap contacting the recording head, and a separated state, in which the recording head and the cap are separated from each other; a second communication interface; and a second controller. The first controller is configured to, in response to receipt of an operation by a user to appoint image data through the operation interface, determine a standby period based on a parameter being in correlation with an receiving interval between receipt of a preceding command and receipt of a record command in the inkjet recording apparatus, the preceding command notifying upcoming transmission of the record command, and the record command being an instruction to the inkjet recording apparatus to record an image expressed in the image data on a medium; generate the record command from the image data; in response to elapse of the determined standby period, transmit the preceding command to the inkjet recording apparatus through the first communication interface; and in response to completion of the generating of the record command, transmit the record command to the inkjet recording apparatus through the first communication interface. The second controller is configured to, in response to receipt of the preceding command from the information processing terminal through the second communication interface, control the moving mechanism to uncap the recording head by shifting the positional relation between the recording head and the cap from the covered state to the separated state; and in response to receipt of the record command notified in the preceding command from the information processing terminal through the second communication interface, and in response to completion of the uncapping, control the recording head in accordance with the record command to discharge the ink from the nozzle to record the image on the medium.

BRIEF DESCRIPTION OF THE ACCOMPANYING DRAWINGS

Figure 1:
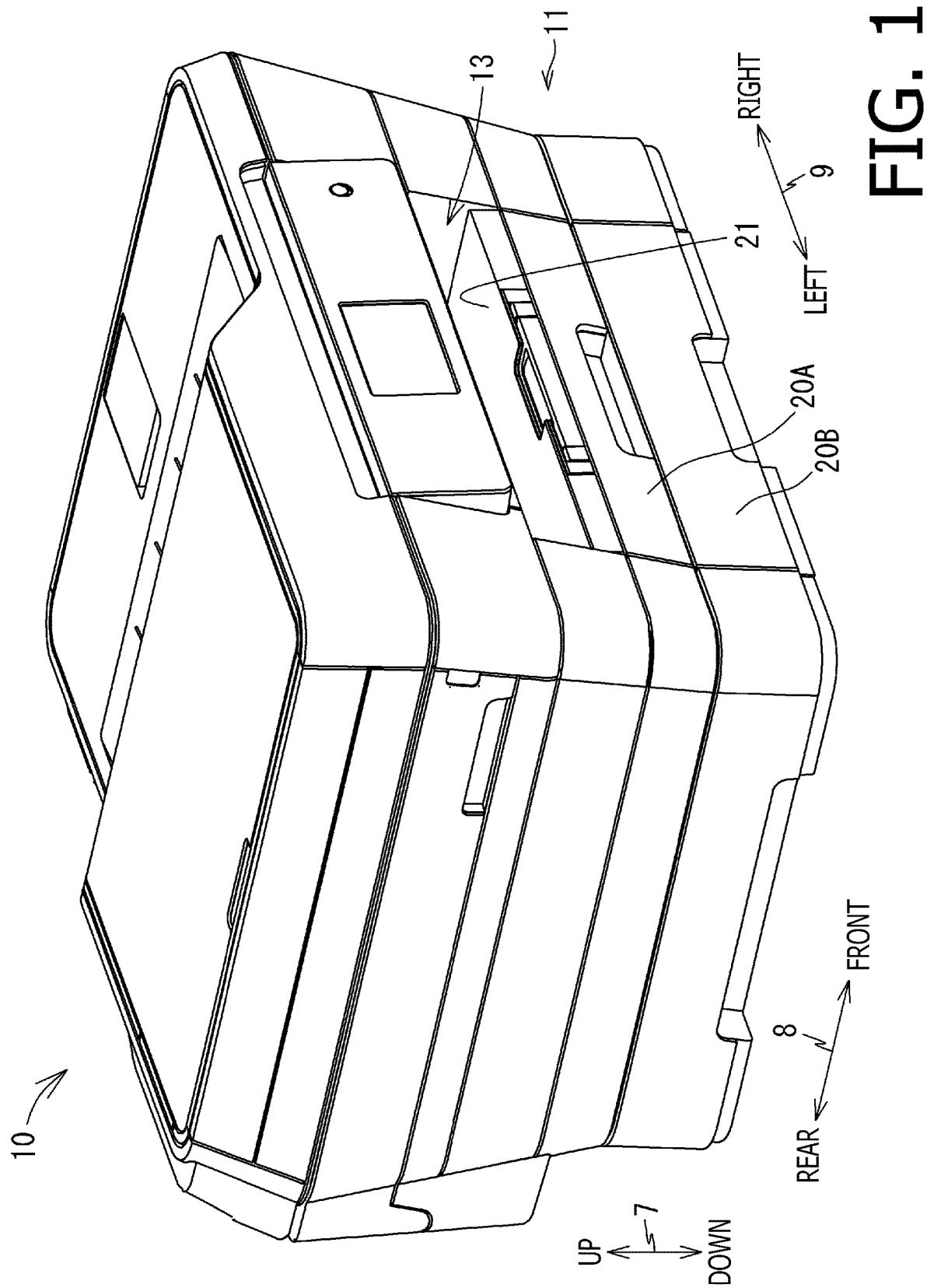
FIG. 1 is a perspective exterior view of a multifunction peripheral (MFP) 10 according to an exemplary embodiment of the present disclosure.

FIG. 3 is a plan view of a carriage 23 and guide rails 43, 44 in the printer 11 according to the exemplary embodiment of the present disclosure.

FIG. 4A is an illustrative view of a maintenance device 70 in the printer 11 according to the exemplary embodiment of the present disclosure. FIG. 4B is an illustrative view of an ink receiver 75 in the printer 11 according to the exemplary embodiment of the present disclosure.

Figure 5A:
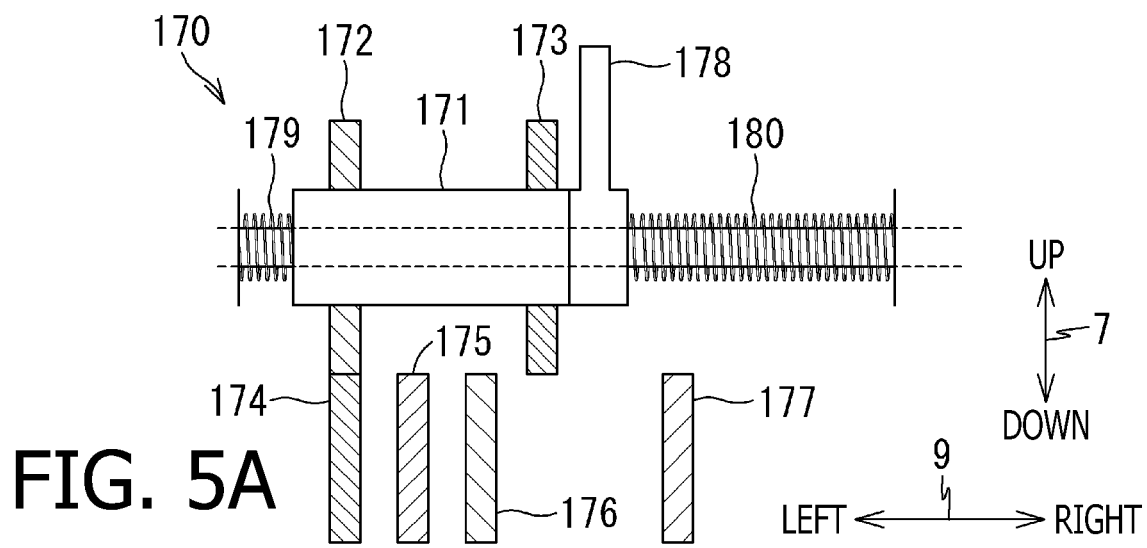
Figure 5B:
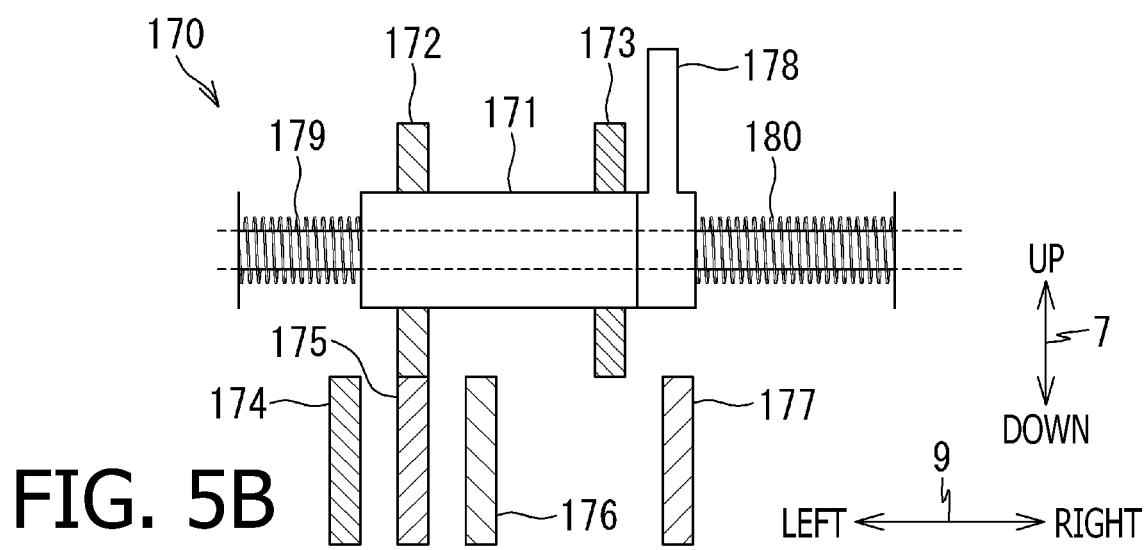
Figure 5C:
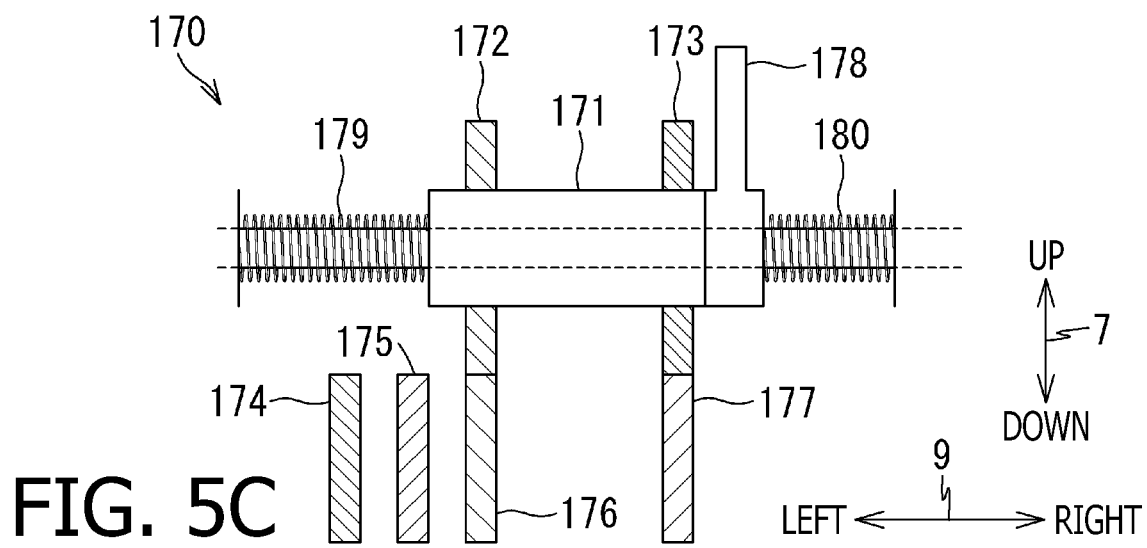

FIGS. 5A, 5B, and 5C are illustrative views of a switcher 170 in a first mode, a second mode, and a third mode, respectively, according to the exemplary embodiment of the present disclosure.

Figure 6:
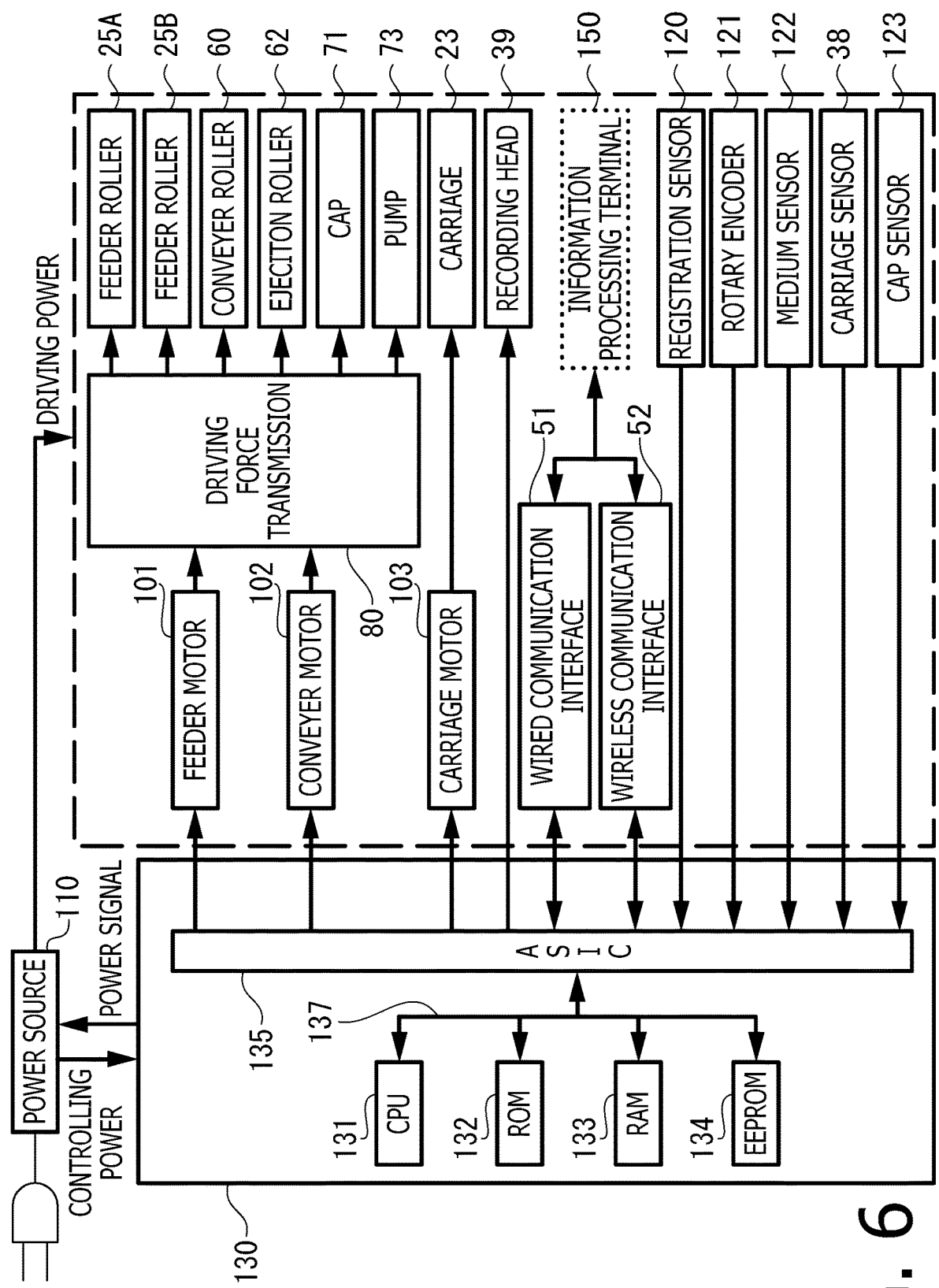

FIG. 6 is a block diagram to illustrate a configuration in the MFP 10 according to the exemplary embodiment of the present disclosure.

Figure 7A:
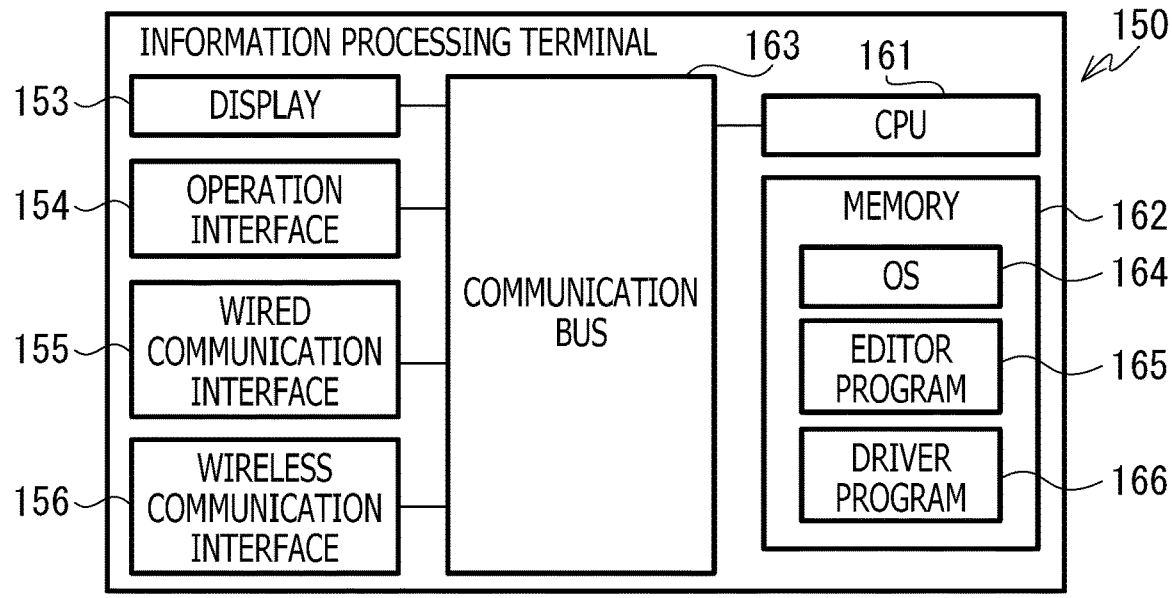
Figure 7B:
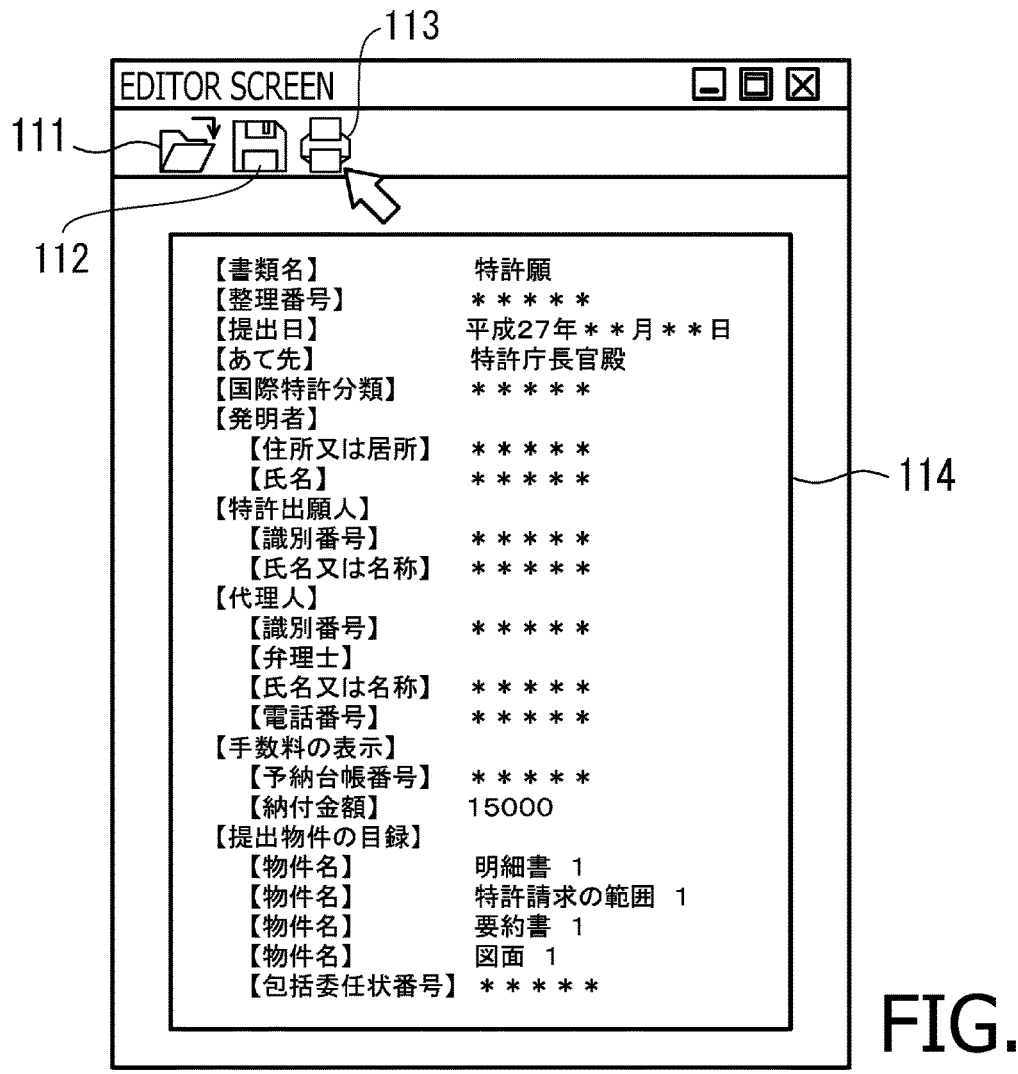

FIG. 7A is a block diagram to illustrate a configuration of an information processing terminal 150 according to the exemplary embodiment of the present disclosure. FIG. 7B is an illustrative view of an editor screen to be displayed in a display 153 of the information processing terminal 150 according to the exemplary embodiment of the present disclosure.

Figure 8A:
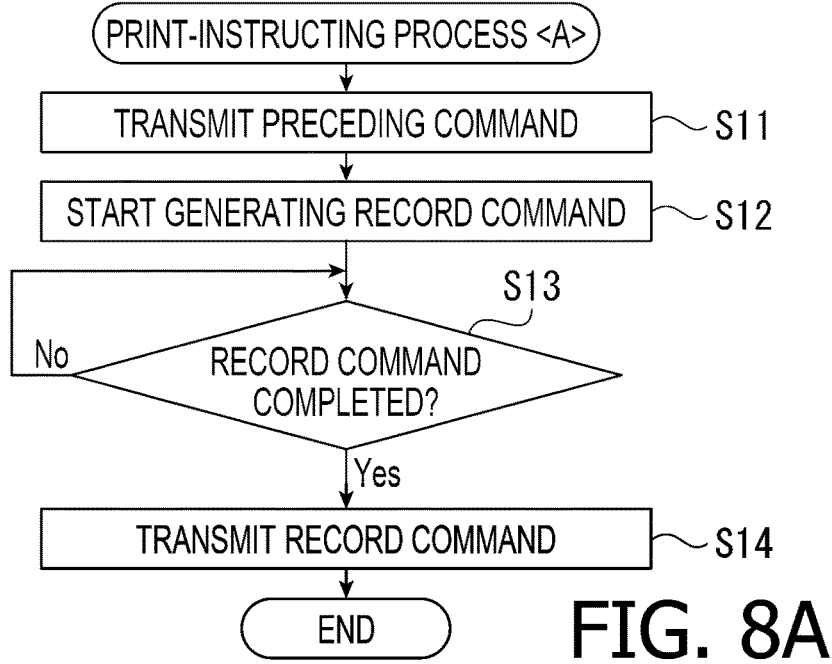
Figure 8B:
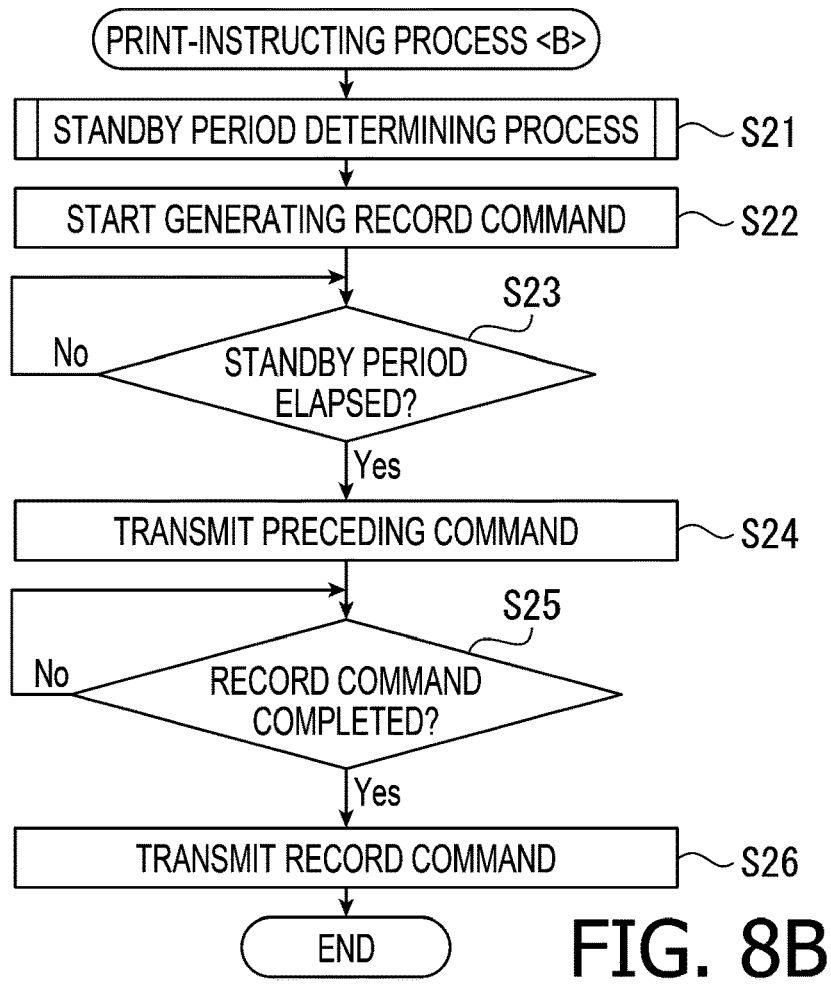

FIGS. 8A and 8B are flowcharts to illustrate flows of steps in a print instruction process <A> and a print instruction process <B>, respectively, to be conducted in the information processing terminal 150 according to the exemplary embodiments of the present disclosure.

Figure 9:
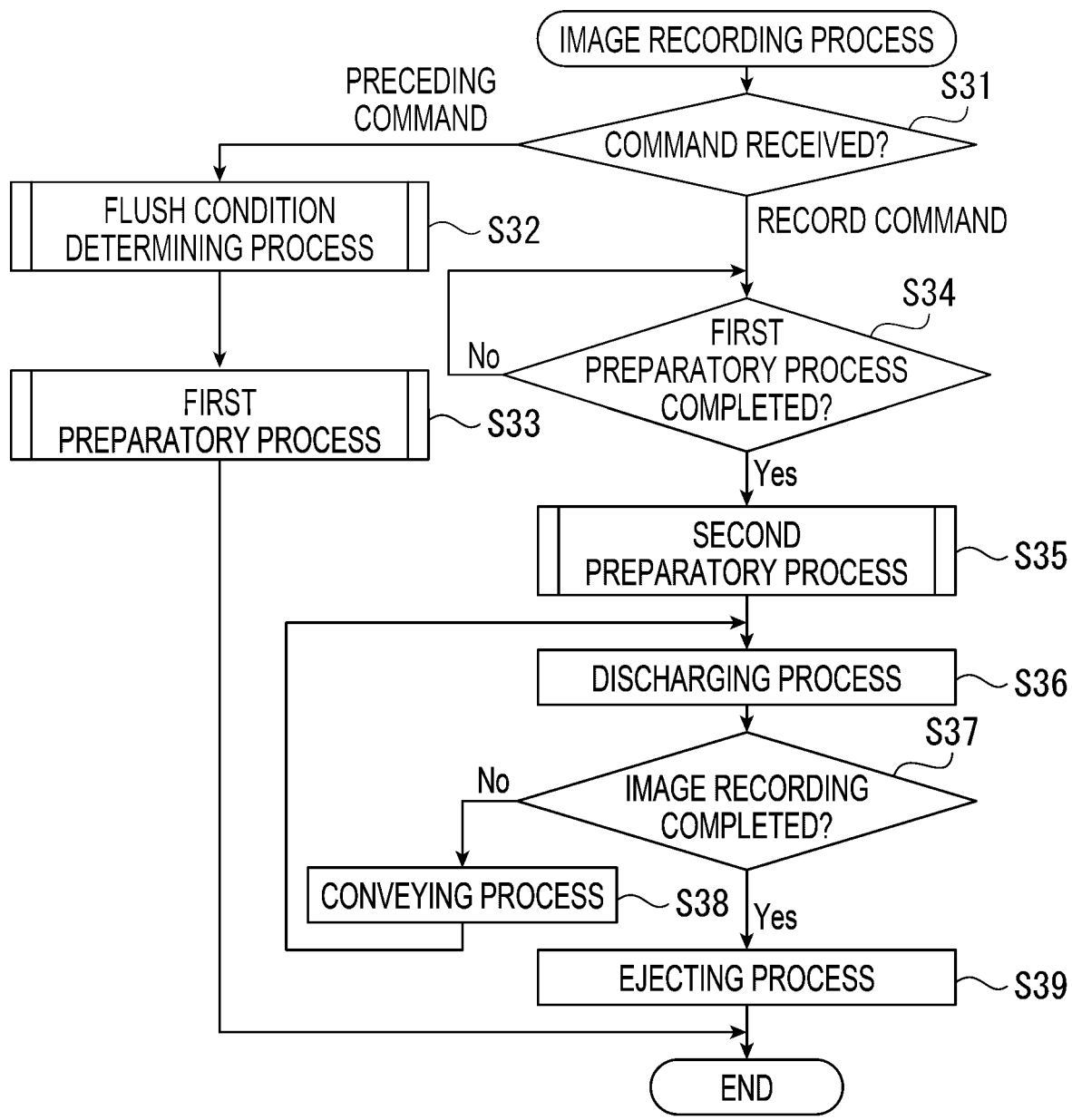

FIG. 9 is a flowchart to illustrate a flow of steps in an image recording process to be conducted in the MFP 10 according to the exemplary embodiment of the present disclosure.

Figure 10:
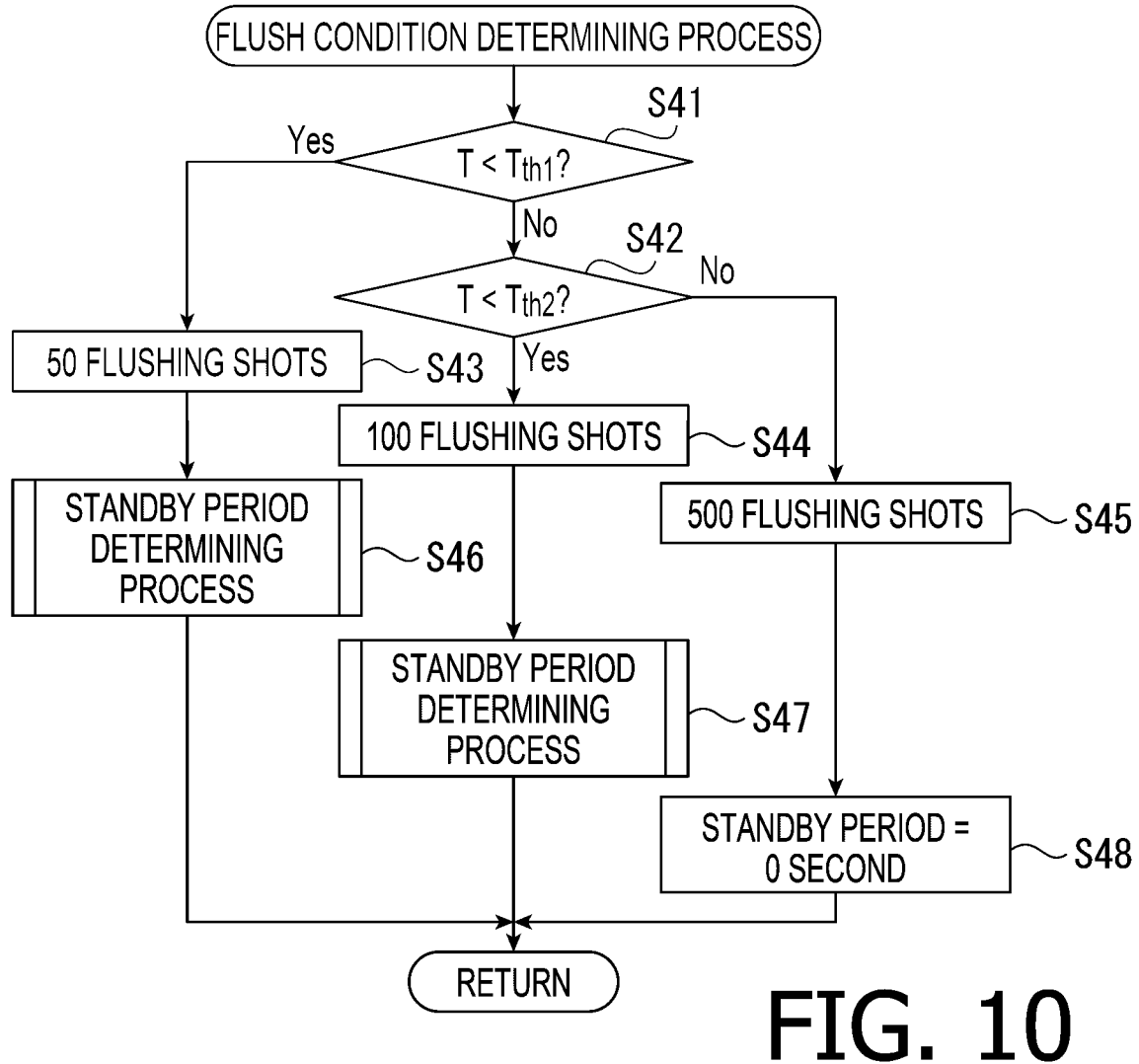

FIG. 10 is a flowchart to illustrate a flow of steps in a flushing condition determining process to be conducted in the MFP 10 according to the exemplary embodiment of the present disclosure.

Figure 11:
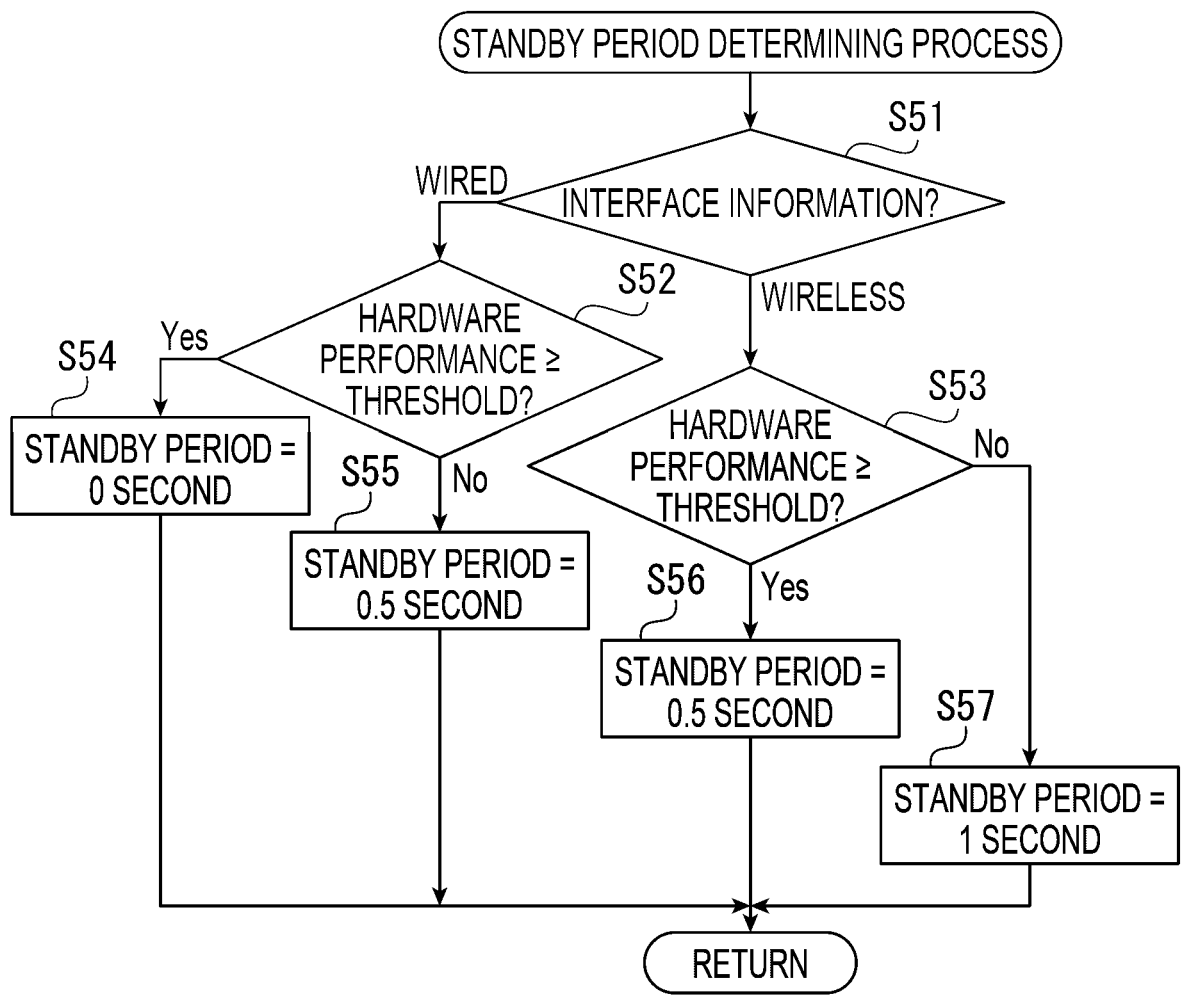

FIG. 11 is a flowchart to illustrate a flow of steps in a standby period determining process to be conducted in the MFP 10 according to the exemplary embodiment of the present disclosure.

Figure 12:
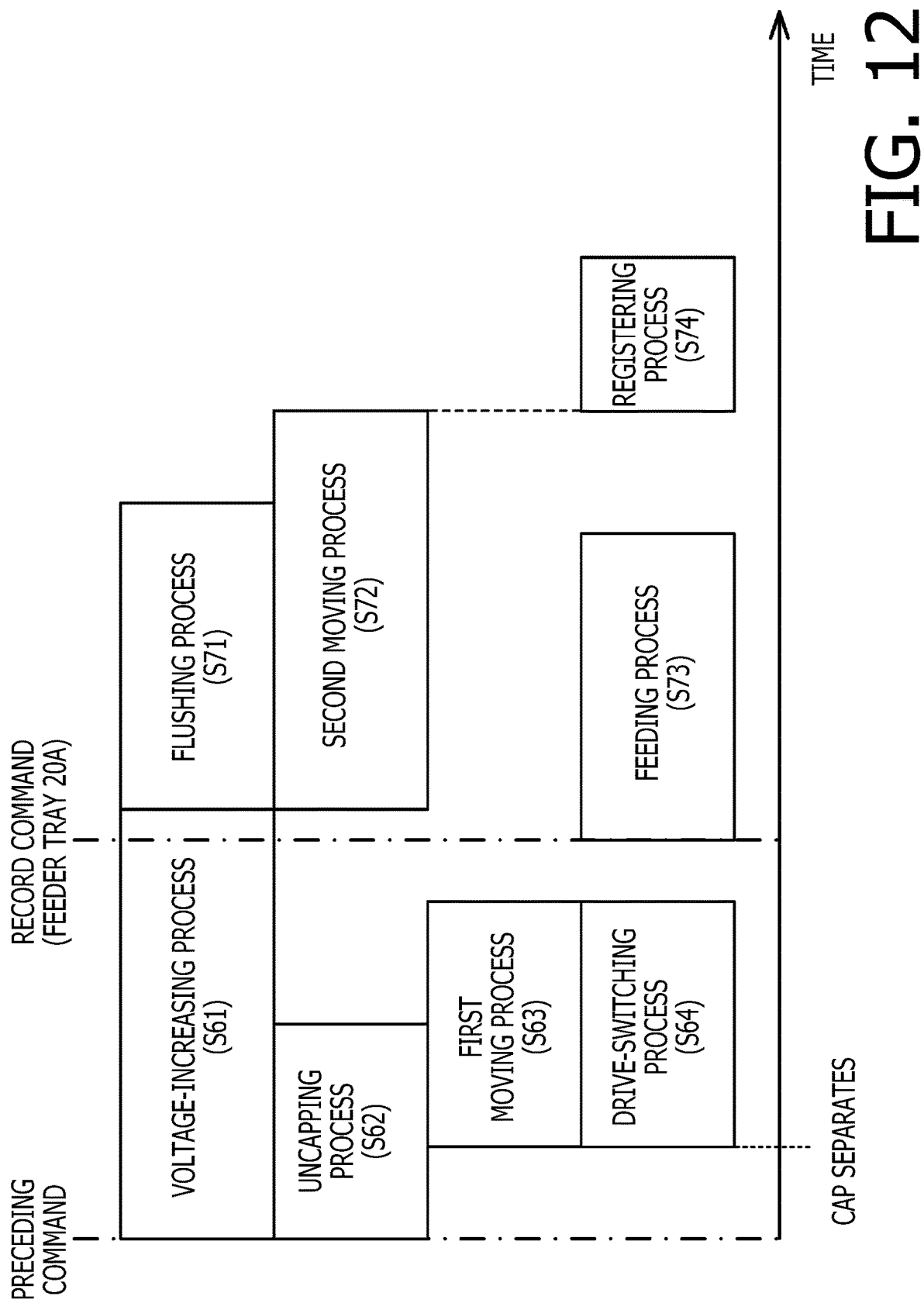

FIG. 12 is a timing chart to illustrate timings to conduct a first preparatory process and a second preparatory process in the MFP 1, when the standby period is zero (0) second, according to the exemplary embodiment of the present disclosure.

Figure 13:
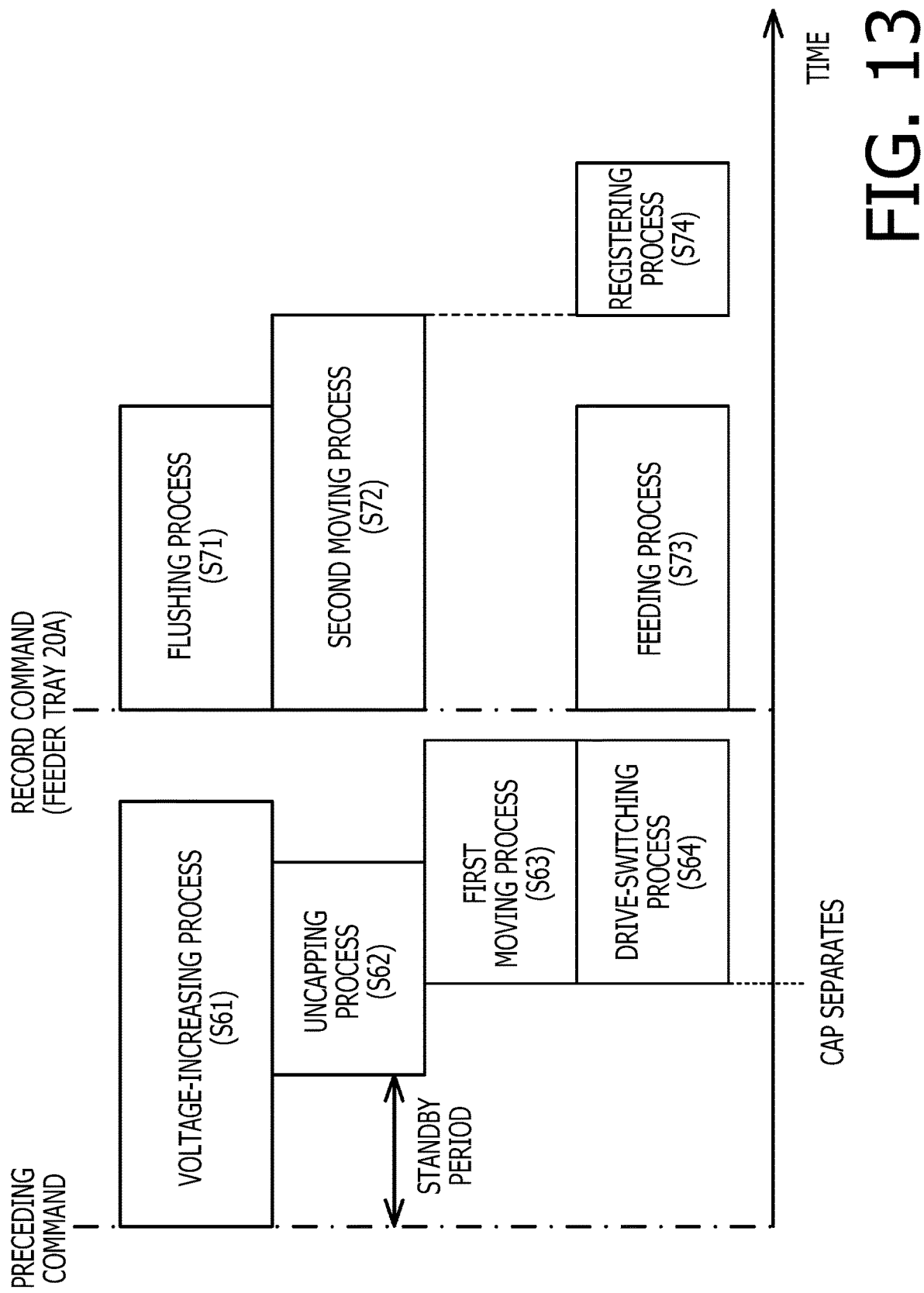

FIG. 13 is a timing chart to illustrate timings to conduct the first preparatory process and the second preparatory process in the MFP 1, when the standby period is longer than zero second, according to the exemplary embodiment of the present disclosure.

DETAILED DESCRIPTION

Hereinafter, the exemplary embodiment according to an aspect of the present disclosure will be described in detail with reference to the accompanying drawings.

It is noted that various connections may be set forth between elements in the following description. These connections in general and, unless specified otherwise, may be direct or indirect and that this specification is not intended to be limiting in this respect.

In the following description, one-way transition for an item to move from one point toward another point may be expressed by a term "orientation" or by a suffix "-ward," e.g., "leftward," "rightward," etc. Meanwhile, two-way movable track for an item to move in one way or the other way between one point and another point along a line or in a circular rotation may be expressed by a term "direction." Further, positional relation within the MFP 10 and each part or item included in the MFP 10 will be mentioned on basis of a user's position to ordinarily use the MFP 10, as indicated by the bi-directionally pointing arrows in some of the drawings. For example, in FIG. 1, a vertical axis between an upper side and a lower side in the drawing may be defined as a vertical direction 7. While a side, on which an opening 13 is arranged, is defined as a front side to the user, a horizontal axis between the front side and a rear side opposite from the front side may be defined as a front-rear direction 8. Further, a horizontal axis between a right-hand side and a left-hand side to the user when the user faces toward the front side of the MFP 10 may be defined as a widthwise direction 9.

[Configuration of System]

A printing system according to the present embodiment includes the MFP 10 shown in FIG. 1 and an information processing terminal 150 shown in FIG. 7A. The MFP 10 and the information processing terminal 150 are connected to communicate with each other through a communication network. The communication network may include, for example, a wired LAN, a wireless LAN, and combination of the wired LAN and the wireless LAN. For another example, the MFP 10 and the information processing terminal 150 may be connected with each other through a cable such as a USB cable. For another example, the communication network may include one or more MFPs 10 and one or more information processing terminals 150.

[Overall Configuration of MFP 10]

The MFP 10 has, as shown in FIG. 1, an overall shape of a six-sided rectangular box. The MFP 10 includes a printer 11 being an inkjet printer. The MFP 10 may further include a scanner (unsigned), which may read an image of an original sheet and generate image data corresponding to the read image.

[Printer 11]

Figure 2:
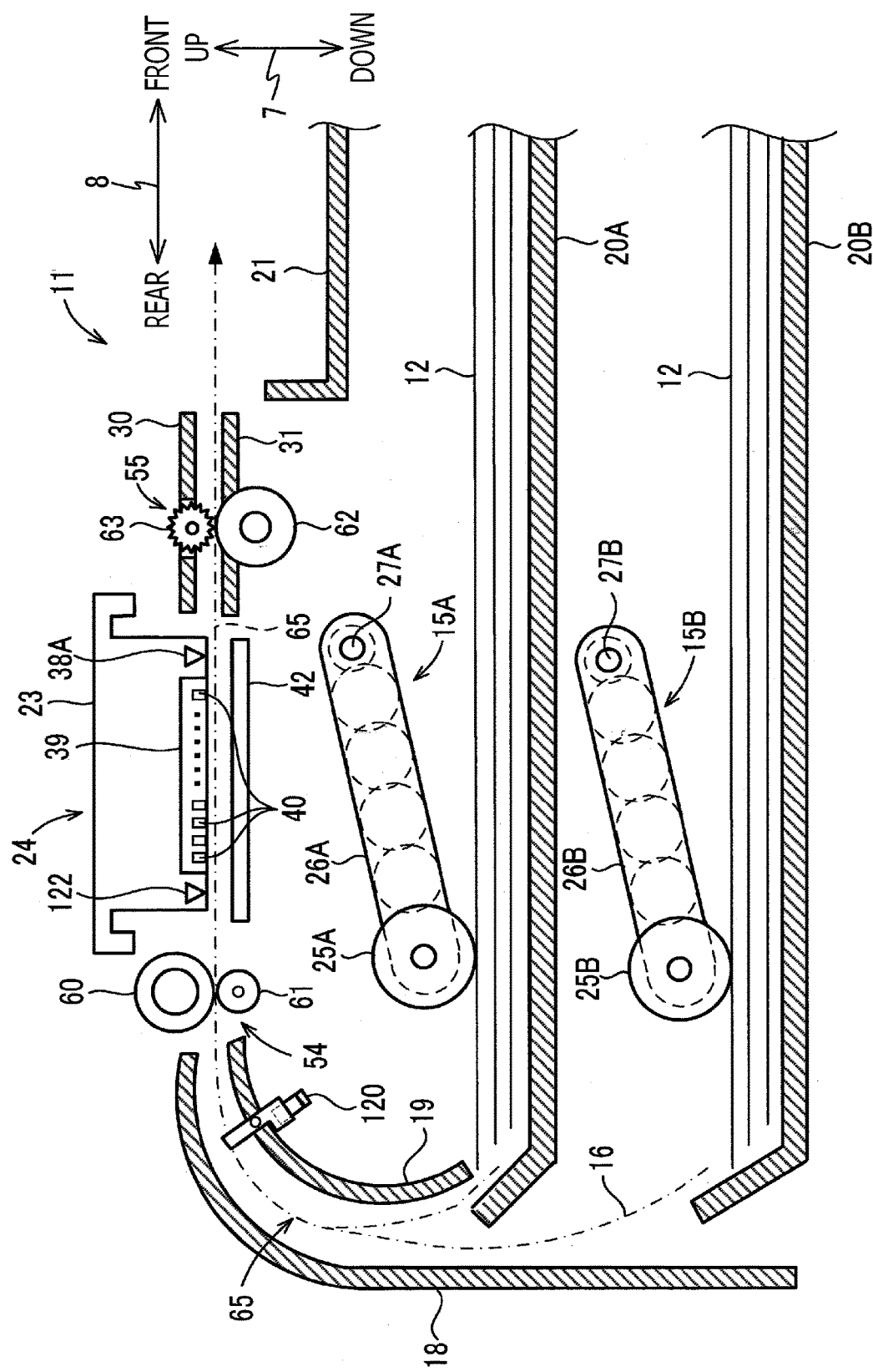
FIG. 2 is a schematic cross-sectional view of a printer 11 in the MFP 10 according to the exemplary embodiment of the present disclosure.

The printer 11 may record an image, which is provided to the printer 11 in a form of image data, on a sheet 12 (see FIG. 2) by discharging ink at the sheet 12. In other words, the printer 11 is an inkjet-recording printer. The printer 11 includes, as shown in FIG. 2, sheet feeders 15A, 15B, feeder trays 20A, 20B, an ejection tray 21, a conveyer roller 54, a recorder 24, an ejection roller 55, and a platen 42.

[Feeder Trays 20A, 20B and Ejection Tray 21]

On a front face of the printer 11, formed is the opening 13 (see FIG. 1). The feeder trays 20A, 20B are movable in the front-rear direction through the opening 13 to be attached to or detached from the printer 11. The feeder trays 20A, 20B may support one or more sheets 12 in stacks thereon. The ejection tray 21 may support the sheet(s) 12 ejected by the ejection roller 55 through the opening 13.

[Sheet Feeders 15A, 15B]

The sheet feeder 15A includes, as shown in FIG. 2, a feeder roller 25A, a feeder arm 26A, and a shaft 27A. The feeder roller 25A is rotatably attached to one end of the feeder arm 26A. The feeder arm 26A is pivotable about the shaft 27A, which is supported by a frame (unsigned) of the printer 11. The feeder arm 26A is urged toward the feeder tray 20A by, for example, the effect of gravity or by an urging force of a spring (not shown). The sheet feeder 15B includes a feeder roller 25B, a feeder arm 26B, and a shaft 27B, which are substantially in a same structure as those in the sheet feeder 15A. The sheets 12A on the feeder tray 20A may be fed by the feeder roller 25A, which is rotatable by a driving force generated by a feeder motor 101 (see FIG. 6) rotating in a normal direction, to a conveyer path 65. The sheets 12A on the feeder tray 20B may be fed by the feeder roller 25B, which is rotatable by the driving force generated by the feeder motor 101 in the normal direction, to the conveyer path 65.

[Conveyer Path 65]

The conveyer path 65 is formed in an area between guide members 18, 19 and in an area between guide members 30, 31. The guide members 18, 30 and the guide members 19, 31 are spaced apart from each other, respectively, for a predetermined amount to face each other inside the printer 11. The conveyer path 65 includes paths that extend in a rearward area in the printer 11 from rearward ends of the feeder trays 20A, 20B. The conveyer path 65 extends upward at the rearward area in the printer 11, curves frontward in an approximate shape of a U, and extends frontward through the recorder 24 to the ejection tray 21. The sheets 12 may be conveyed in the conveyer path 65 in a conveying orientation 16, which is indicated by a dash-and-dotted arrow shown in FIG. 2.

[Conveyer Roller 54]

The conveyer roller 54 is disposed on an upstream side of the recorder 24 along the conveying orientation 16. The conveyer roller 54 includes a conveyer roller 60 and a pinch roller 61, which are paired to face each other. The conveyer roller 54 may be driven to rotate by a driving force generated by normal rotation of a conveyer motor 102 (see FIG. 6) and transmitted thereto. The pinch roller 61 may rotate along with the rotation of the conveyer roller 60. The sheet 12 may be pinched between the conveyer roller 60 rotating in a normal direction and the pinch roller 61 and conveyed along the conveying orientation 16. The conveyer roller 60 is rotatable in a reverse direction by a driving force generated by the conveyer motor 102 when the conveyer motor 102 rotates in a reverse direction.

[Ejection Roller 55]

The ejection roller 55 is disposed on a downstream side of the recorder 24 along the conveying orientation 16. The ejection roller 55 includes an ejection roller 62 and a spur wheel 63, which are paired to face each other. The ejection roller 62 may be driven to rotate by the rotation of the conveyer motor 102. The spur wheel 63 may rotate along with the rotation of the ejection roller 62. The sheet 12 may be pinched between the ejection roller 62 rotating a normal direction and the spur wheel 63 and conveyed along the conveying orientation 16.

[Registration Sensor 120]

The printer 11 includes, as shown in FIG. 2, a registration sensor 120, which is disposed on an upstream side of the conveyer roller 54 along the conveying orientation 16. The registration sensor 120 may output different-leveled detection signals depending on presence and absence of the sheet 12 in a detective area corresponding to a position of the registration sensor 120. For example, the registration sensor 120 may output a high-leveled detection signal to a controller 130 (see FIG. 6) in response to detecting presence of the sheet 12 at the detective area and a low-leveled detection signal to the controller 130 in response to detection of absence of the sheet 12 at the detective area.

[Rotary Encoder 121]

The printer 11 includes, as shown in FIG. 6, a rotary encoder 121, which may generate pulse signals according to the rotation of the conveyer roller 60, in other words, according to the driving rotation of the conveyer motor 102. The rotary encoder 121 includes an encoder disk and an optical sensor, which are not shown. The encoder disk may rotate along with the rotation of the conveyer roller 60. The optical sensor may read the rotation of the encoder disk, generate pulse signals corresponding to the rotation of the encoder disk, and output the generated pulse signals to the controller 130.

[Recorder 24]

The recorder 24 is, as shown in FIG. 2, arranged between the conveyer roller 54 and the ejection roller 55 along the conveying orientation 16. The recorder 24 is arranged to vertically face a platen 42 along the vertical direction 7. The recorder 24 includes a carriage 23, a recording head 39, an encoder sensor 38A, and a medium sensor 122. The carriage 23 is, as shown in FIG. 3, connected with an ink tube 32 and a flexible flat cable 33. The ink tube 32 may supply ink from an ink cartridge (not shown) to the recording head 39. The flexible flat cable 33 electrically connects the recording head 39 with a control board (not shown), on which the controller 130 is mounted.

The carriage 23 is, as shown in FIG. 3, supported by guide rails 43, 44, which are arranged along the widthwise direction 9 to be spaced apart along the front-rear direction 8 from each other. The carriage 23 is coupled with a known driving belt (not shown), which is arranged on the guide rail 44 and may be driven to circulate by a carriage motor 103 (see FIG. 6). As the driving belt circulates, the carriage 23 coupled to the driving belt may reciprocate in one orientation and in a reversed orientation along the widthwise direction 9 in an area, which includes a sheet-facing area.

The sheet-facing area refers to an area, in which the carriage 23 may face with the sheet 12 being conveyed by the conveyer roller 54 and/or the ejection roller 55, and extends longitudinally in a main scanning direction, which may coincide with the widthwise direction 9. In other words, the sheet-facing area refers to a part of an area ranging above the sheet 12, when the sheet 12 is conveyed over the platen 42 by the conveyer roller 54 and/or the ejection roller 55, and through which the carriage 23 may reciprocate. The carriage 23 may move in, additionally to the sheet-facing area, a left-side area and a right-side area with respect to the sheet-facing area. In other words, the carriage 23 may move in the widthwise direction 9 between the left-side area and the right-side area with respect to the sheet-facing area through the sheet-facing area.

The recording head 39 is, as shown in FIG. 2, mounted on the carriage 23. A lower surface of the recording head 39 forms a nozzle surface, through which a plurality of nozzles 40 are formed. The recording head 39 includes a plurality of driving devices (not shown), such as piezo actuators, each of which is provided to one of the plurality of nozzles 40. In other words, the recording head 39 includes a plurality of sets of a nozzle 40 and a driving device. The recording head 39 may be driven to discharge ink droplets through the nozzles 40 by vibration of the piezo actuators. As the carriage 23 moves in the widthwise direction 9, the recording head 39 may discharge the ink droplets at the sheet 12, which is on the platen 42, to record an image on the sheet 12 in the ink.

The driving devices may be, for example, but not necessarily limited to, discharging-energy generating devices, to which driving voltages from a power source 110 (FIG. 6) may be applied, and which may generate vibrating energy to discharge the ink droplets from the nozzles 40 from the applied voltages. Meanwhile, the discharging-energy generating devices may be, for another example, heaters to generate thermal energy. The heaters may heat the ink by the thermal energy generated from the driving voltage applied by the power source 110 to discharge droplets of foamed ink through the nozzles 40. The recording head 39 may discharge, for example, pigmentary ink, or for another example, dye ink.

The nozzles 40 are, as shown in FIGS. 2 and 4, arranged in to align in lines along the front-rear direction 8 and in rows along the widthwise direction 9. A line of ink aligned along the front-rear direction 8 may discharge ink droplets in a same color. On the nozzle surface, 24 lines of nozzles 40 may align along the widthwise direction 9. Six (6) lines of nozzles 40 adjoining along the widthwise direction 9 may discharge ink droplets in a same color. For example, first six lines of nozzles 40 from the right may discharge droplets of ink in black, second six lines of nozzles 40 from the right may discharge droplets of ink in yellow, third six lines of nozzles 40 from the right may discharge droplets of ink in cyan, and fourth six lines of nozzles 40 from the right may discharge droplets of ink in magenta. It may be noted that the quantity and/or arrangement of the colors of the ink to be discharged may not necessarily be limited to those mentioned above.

Meanwhile, on the guide rail 44, as shown in FIG. 3, arranged is an encoder strip 38B, which longitudinally extends in the widthwise direction 9. Meanwhile, an encoder sensor 38A is arranged on a lower surface of the carriage 23 at a position to vertically face the encoder strip 38B. As the carriage 23 moves in the widthwise direction 9, the encoder sensor 23 may read indication of the encoder strip 38B, generate pulse signals corresponding to the indication of the encoder strip 38B, and output the generated pulse signals to the controller 130. The encoder sensor 38A and the encoder strip 38B may together form a carriage sensor 38 (see FIG. 6).

[Medium Sensor 122]

The medium sensor 122 is, as shown in FIG. 2, mounted on a downward surface, i.e., a surface facing the platen 42. The medium sensor 122 includes a light-emitter and light-receiver, which include, for example, a light-emitting diode and an optical sensor, respectively. The light-emitter may emit light in a predetermined amount commanded by the controller 130 at the platen 42. The light emitted from the light emitter may reflect on either the platen 42 or the sheet 12 on the platen 42 and received by the light-receiver. The medium sensor 122 may output detection signals corresponding to an amount of the received light to the controller 130. For example, a level of the signal to be output from the medium sensor 122 may be higher when the amount of the received light is larger.

[Platen 42]

The platen 42 is, as shown in FIG. 2, disposed between the conveyer roller 54 and the ejection roller 55 along the conveying orientation 16. The platen 42 is arranged to face the recorder 24 along the vertical direction 7. The platen 42 may support the sheet 12 conveyed by at least one of the conveyer roller 54 and the ejection roller 55 from a lower side. The platen 42 may have a lower optical reflectance rate than the sheet 12.

[Maintenance Device 70]

The printer 11 includes, as shown in FIG. 3, a maintenance device 70, which may work to maintain the recording head 39 operable. In particular, the maintenance device 70 may conduct a purging process to remove remainder ink, including air in the ink and obstacles adhered to the nozzle surface, from the nozzles 40. The remainder ink removed from the nozzles 40 by the maintenance device 70 may be collected in a waste liquid tank 74 (see FIG. 4A). The maintenance device 70 may be, as shown in FIG. 3, located at a rightward and lower position with respect to the sheet-facing area. The maintenance device 70 includes, as shown in FIG. 4A, a cap 71, a tube 72, and a pump 73.

The cap 71 may be made of rubber. The cap 71 is located at a position to face the recording head 39 on the carriage 23 when the carriage 23 is located at a maintenance position, which is a rightward position with respect to the sheet-facing area in the widthwise direction 9. The tube 72 connects the cap 71 to the waste liquid tank 74 through the pump 73. The pump 73 may be, for example, a rotary-typed tube pump. The pump 73 driven by the conveyer motor 102 may aspirate the remainder ink from the nozzles 40 through the cap 71 and the tube 72 and deliver the remainder ink to the waste liquid tank 74 through the tube 72.

The cap 71 may move between a covering position, at which the cap 71 may cover the recording head 39, and a separate position, at which the cap 71 is separated from the covering position in the vertical direction 7. When in the covering position, the cap 71 may fit to the recording head 39 on the carriage 23 being at the maintenance position to seal the nozzle surface of the recording head 39. In other words, the cap 71 and the recording head 39 are in a covered state, in which the nozzles 40 are covered by the cap 71, when the cap 71 is at the covering position. On the other hand, the cap 71 and the recording head 39 are in a separated state, in which the recording head 39 and the cap 71 are separated from each other, when the cap 71 is at the separate position. The cap 71 may be, for example, moved vertically up and down by, but not necessarily limited to, a vertically-moving device 76 (see FIG. 4A), which may be driven by the feeder motor 101, between the covering position and the separate position.

For another example, the cap 71 may be moved by a linking device (not shown), which may operate in conjunction with the carriage 23 moving in the widthwise direction 7, rather than the lifting device 76 driven by the feeder motor 101. The linking device may move between a first posture, in which the linking device holds the cap 71 at the covering position, and a second posture, in which the linking device holds the cap 71 at the separate position. The linking device may be, for example, pushed by the carriage 23 moving rightward toward the maintenance position to move from the second posture to the first posture. For another example, the linking device may be pushed by the carriage 23 moving leftward from the maintenance position to move from the first posture to the second posture.

For another example, the MFP 10 may have a vertically-moving device (not shown), which may move the guide rails 43, 44 vertically up and down, rather than the devices that may move the cap 71. For example, the carriage 23 at the maintenance position 23 may be moved vertically along with the guide rails 43, 44 which are moved vertically by the vertically-moving device. Meanwhile, the cap 71 may be fixed at the position to vertically face the recording head 39 mounted on the carriage 23, which is located at the maintenance position. When the guide rails 43, 44 and the carriage 23 are lowered by the vertically-moving device to a lower predetermined position, the nozzle surfaces of the recording head 39 may be covered by the cap 71. When the guide rails 43, 44 and the carriage 23 are uplifted by the vertically-moving device to an upper predetermined position, the recording head 39 may be separated from the cap 71, and the carriage 23 may be enabled to move in the main scanning direction.

For another example, the MFP 10 may have both of the vertically-moving device 76 to move the cap 71 and the vertically-moving device to move the guide rails 43, 44. Thus, the carriage 23 and the cap 71 may be moved closer to each other to fit the cap 71 to the nozzle surface. The carriage 23 and the cap 71 may be moved to be separated from each other to separate the cap 71 from the nozzle surface. In this regard, the covering position and the separate position may refer to positional relation between the recording head 29 and the cap 71. The positional relation between the recording head 39 and the cap 71 may be changed by moving one of or both of the recording head 39 and the cap 71. In other words, when the recording head 39 and the cap 71 are moved relatively to each other, the positional relation in the recording head 39 and the cap 71 may be changed.

[Cap Sensor 123]

The printer 11 includes, as shown in FIG. 6, a cap sensor 123. The cap sensor 123 may output detection signals in different levels depending on the position of the cap 71. For example, the cap sensor 123 may output a high-leveled detection signal to the controller 123 in response to detecting the cap 71 located at the covering position and a low-leveled detection signal to the controller 130 in response to detecting the cap 71 located at a position different from the covering position. When the cap 71 being located at the covering position is moved to the separate position, the detection signals output from the cap sensor 123 may change from the high-leveled signal to the low-level signal as soon as the cap 71 leaves the covering position and before the cap 71 reaches the separate position.

[Ink Receiver 75]

The printer 11 includes, as shown in FIG. 3, an ink receiver 75. The ink receiver 75 is located at a leftward and lower position with respect to the sheet-facing area. In particular, the ink receiver 75 is located at a position to face the lower surface of the recording head 39 mounted on the carriage 23 when the carriage 23 is at the left-side area with respect to the sheet-facing area. However, the maintenance device 70 and the ink receiver 75 may not necessarily be located on different sides of the sheet-facing area along the main scanning direction but may be located on a same side. When the maintenance device 70 and the ink receiver 75 are located on the same side of the sheet-facing area along the main scanning direction, the maintenance device 70 and the ink receiver 75 should be separated from each other along the main scanning direction.

The ink receiver 75 is, as shown in FIG. 4B in an approximate shape of a top-open rectangular box with an opening 75A at a top thereof. A width of the opening 85A along the main scanning direction may be smaller than a width of the nozzle surface along the main scanning direction. Inside the ink receiver 75, disposed are guide walls 75B, 75C, which are spaced apart along the widthwise direction 9 from each other and spread to intersect with the main scanning direction.

The guide walls 75B, 57C are each in a shape of a plate spreading in the vertical direction 7 and the front-rear direction 8. With respect to the widthwise direction 9, the guide walls 75B, 75C are arranged to incline. In particular, the guide walls 75B, 75C inside the ink receiver 75 are in such an arrangement that surfaces thereof on the left are oriented not straight to the left but upper-leftward. Therefore, as shown in FIG. 4B, upper ends of the guide walls 75B, 75C are closer to the right than lower ends of the guide walls 75B, 75C. The guide walls 75B, 75C may direct the ink droplets discharged from the recording head 39 inward, i.e., to a bottom of the ink receiver 75. It may be noted that a quantity of the guide walls 75B, 75C is not limited to two (2).

Alternatively to the ink receiver 75, the cap 71 may be configured to receive the ink droplets discharged from the recording head 39.

[Driving Force Transmission 80]

The printer 11 includes, as shown in FIG. 6, a driving force transmission 80. The driving force transmission 80 may transmit the driving force from the feeder motor 101 and from the conveyer motor 102 to the feeder rollers 25A, 25B, the conveyer roller 60, the ejection roller 62, the vertically-moving device 76 for the cap 71, and the pump 73. One or more of a gear, a pulley, an endless belt, a planet-gear system, a pendulum gear system, and a one-way clutch may be assembled together to form the driving force transmission 80. The driving force transmission 80 further includes a switcher 170 (see FIG. 5), which may switch destinations of the driving force from the feeder motor 101 and from the conveyer motor 102.

[Switcher 170]

The switcher 170 is, as shown in FIG. 3, located at a rightward position with respect to the sheet-facing area and at a lower position with respect to the guide rail 43. The switcher 170 includes, as shown in FIG. 5, a slider 171, driving gears 172, 173, driven gears 174, 175, 176, 177, a lever 178, and springs 179, 180. The switcher 170 may switch transmittable modes thereof among a first mode, a second mode, and a third mode.

In the first mode, the driving force from the feeder motor 101 may be transmitted to the feeder roller 25A but to neither of the feeder roller 25B nor the vertically-moving device 76 for the cap 71. In the second mode, the driving force from the feeder motor 101 may be transmitted to the feeder roller 25B but to neither of the feeder roller 25A nor the vertically-moving device 76 for the cap 71. In the third mode, the driving force from the feeder motor 101 may be transmitted to the vertically-moving device 76 for the cap 71 but to neither of the feeder rollers 25A, 25B. In the first mode and the second mode, further, the driving force from the conveyer motor 102 may be transmitted to the conveyer roller 60 and the ejection roller 62 but not to the pump 73. In the third mode, the driving force from the conveyer motor 102 may be transmitted to the conveyer roller 60, the ejection roller 62, and the pump 73.

The slider 171 is in a cylindrical shape supported by a supporting shaft, which is indicated by broken lines in FIGS. 5A-5C, extending in the widthwise direction 9. The slider 171 is slidable on the supporting shaft along the widthwise direction 9. The slider 171 supports the driving gears 172, 173 on an outer surface thereof at different positions along the widthwise direction 9 independently rotatably. In other words, the driving gears 172, 173 are rotatable on the outer surface of the slider 171 to rotate independently from each other. The slider 171 and the driving gears 172, 173 may slide in the widthwise direction 9 jointly.

The driving gear 172 may be rotated by the rotating driving force from the feeder motor 101 transmitted thereto. The driving gear 172 may mesh with one of the driven gears 174, 175, 176. In particular, the driving gear 172 meshes with the driven gear 174, as shown in FIG. 5A, when the switcher 170 is in the first mode. When the switcher 170 is in the second mode, as shown in FIG. 5B, the driving gear 172 meshes with the driven gear 175. When the switcher 170 is in the third mode, as shown in FIG. 5C, the driving gear 172 meshes with the driven gear 176.

The driving gear 173 may be rotated by the rotating driving force from the conveyer motor 102 transmitted thereto. The driving gear 173 is unmeshed from the driven gear 177, as shown in FIGS. 5A and 5B, when the switcher 170 is in the first mode and the second mode. When the switcher 170 is in the third mode, as shown in FIG. 5C, the driving gear 173 meshes with the driven gear 177.

The driven gear 174 meshes with a gear train (not shown), which may rotate the feeder roller 25A. Therefore, the rotating driving force from the feeder motor 101 may be transmitted to the feeder roller 25A when the driving gear 172 meshes with the driven gear 174. In other words, the rotating driving force from the feeder motor 101 may not be transmitted to the feeder roller 25A when the driving gear 172 is unmeshed from the driven gear 174.

The driven gear 175 meshes with a gear train (not shown), which may rotate the feeder roller 25B. Therefore, the rotating driving force from the feeder motor 101 may be transmitted to the feeder roller 25B when the driving gear 172 meshes with the driven gear 175. In other words, the rotating driving force from the feeder motor 101 may not be transmitted to the feeder roller 25B when the driving gear 172 is unmeshed from the driven gear 175.

The driven gear 176 meshes with a gear train (not shown), which may drive the vertically-moving device 76 for the cap 71. Therefore, the rotating driving force from the feeder motor 101 may be transmitted to the vertically-moving device 76 for the cap 71 when the driving gear 172 meshes with the driven gear 176. In other words, the rotating driving force from the feeder motor 101 may not be transmitted to the vertically-moving device 76 when the driving gear 172 is unmeshed from the driven gear 176.

The driven gear 177 meshes with a gear train (not shown), which may drive the pump 73. Therefore, the rotating driving force from the conveyer motor 102 may be transmitted to the pump 73 when the driving gear 173 meshes with the driven gear 177. In other words, the rotating driving force from the conveyer motor 102 may not be transmitted to the pump 73 when the driving gear 173 is unmeshed from the driven gear 177.

Meanwhile, the rotating driving force from the conveyer motor 102 may be transmitted to the conveyer roller 60 and the ejection roller 62 without being transmitted through the switcher 170. Therefore, the conveyer roller 60 and the ejection roller 62 may be driven by the rotating driving force from the conveyer motor 102 to rotate regardless of the transmittable mode in the switcher 170.

The lever 178 is supported by the supporting shaft at a rightward adjoining position to the slider 171. The lever 178 is slidable on the supporting shaft along the widthwise direction 90. The lever 178 extends upward through an opening 43A (see FIG. 3) formed in the guide rail 43 to a position, in which an upper part of the lever 178 may be pushed by the carriage 23. Thus, the lever 178 may be moved by the carriage 23 to slide in the widthwise direction. Meanwhile, the switcher 170 has a plurality of stoppers (not shown), which are engageable with the lever 178 so that the lever 178 engaged with one of the stoppers may stay at the engaged position when the carriage 23 stops pushing the lever 178 and moves to be away from the lever 178. The stoppers may include a first stopper, a second stopper, and a third stopper, which are not shown.

The springs 179, 180 are supported on the supporting shaft. The spring 179 is arranged to contact a frame (unsigned) of the printer 11 at one end thereof, e.g., a leftward end, and to contact a leftward surface of the slider 171 at the other end thereof, e.g., a rightward end. Therefore, the spring 179 urges the slider 171 and the lever 178 being in contact with the slider 171 rightward. The spring 180 is arranged to contact a frame (unsigned) of the printer 11 at one end thereof, e.g., a rightward end, and to contact a rightward surface of the lever 178 at the other end thereof, e.g., a leftward end. Therefore, the spring 180 urges the lever 178 and the slider 171 being in contact with the lever 178 leftward. An intensity of the urging force of the spring 180 is greater than an intensity of the spring 179.

The switcher 170 is in the first mode when the lever 178 is engaged with the first stopper. In the first mode, the lever 178 being pushed by the carriage 23 moving rightward may move rightward against the urging force of the spring 180 to be engaged with the second stopper, which is located rightward with respect to the first stopper. Thereby, the slider 171 may follow the lever 178 to move rightward due to the urging force of the spring 179. Accordingly, the switcher 170 is shifted from the first mode shown in FIG. 5A to the second mode shown in FIG. 5B. In other words, the lever 178 may be pushed by the carriage 23 moving rightward toward the maintenance position and switch the transmittable modes in the switcher 170 from the first mode to the second mode.

The lever 178 pushed by the carriage 23 moving toward the maintenance position may move rightward against the urging force of the spring 180 to be engaged with the third stopper, which is located rightward with respect to the second stopper. Thereby, the slider 171 may follow the lever 178 to move rightward due to the urging force of the spring 179. Accordingly, the switcher 170 is shifted from the second mode shown in FIG. 5B to the third mode shown in FIG. 5C. In other words, the lever 178 may be pushed by the carriage 23 moving rightward toward the maintenance position and switch the transmittable modes in the switcher 170 from the second mode to the third mode.

The carriage 23 may move further rightward from the maintenance position to be away from the lever 178 and switch the orientations to move leftward. The lever 23 separated from the carriage 23 may be disengaged from the third stopper. Accordingly, the slider 171 and the lever 178 may move leftward due to the urging force of the spring 180, and the lever 178 may be engaged with the first stopper. Accordingly, the transmittable modes in the switcher 170 may be switched from the third mode shown in FIG. 5C to the first mode shown in FIG. 5A. In other words, the lever 178 may be separated from the carriage 23 moving leftward from the maintenance position and switch the transmittable modes in the switcher 170 from the third mode to the first mode.

Thus, the transmittable modes in the switcher 170 may be switched by contact or separation of the carriage 23 from the lever 178. In other words, the destinations of the driving forces of the feeder motor 101 and the conveyer motor 102 may be switched by the carriage 23. Meanwhile, the transmittable modes in the switcher 170 may not be switched from the third mode to the second mode directly but may be switched from the third mode to the first mode transitively and to the second mode.

[Power Source 110]

The MFP 10 includes, as shown in FIG. 6, a power source 110. The poser source 110 includes electric circuits, which may distribute power supplied from an external power supplier through a power plug to devices in the MFP 10. In particular, the power source 110 may achieve power from the external power supplier and may output driving voltage (e.g., 24V) to each of the motors 101, 102, 103 and the recording head 39 and controlling voltage (e.g., 5V) to the controller 130.

The power source 110 may switch operable modes in the MFP 10 between a driving mode and a sleep mode based on signals concerning the power output from the controller 130. In particular, the controller 130 may output higher-leveled power signal (e.g., 5V) to switch the operable modes in the power source 110 from the sleep mode to the driving mode and may output lower-leveled power signal (e.g., 0V) to switch the operable modes in the power source 100 from the driving mode to the sleep mode.

The driving mode may refer to an operable mode, in which the power source 100 is outputting the driving voltages to the motors 101, 102, 103 and the recording head 39. In other words, the motors 101, 102, 103 and the recording head 39 may be operable when the power source 100 is in the driving mode. The sleep mode refers to an operable mode, in which the power source 100 is not outputting the driving voltages to the motors 101, 102, 103 or the recording head 39. In other words, none of the motors 101, 102, 103 and the recording head 39 may be operable when the power source 100 is in the sleep mode. Meanwhile, the power source 110 outputs the controlling voltages to the controller 130, a wired communication interface 51, and a wireless communication interface 52 regardless of the operable mode of the power source 110, i.e., when in the driving mode and in the sleep mode.

[Controller 130]

The controller 130 includes, as shown in FIG. 6, a CPU 131, a ROM 132, a RAM 133, an EEPROM 134, and an ASIC 135, which are mutually connected through an internal bus 137. The ROM 132 may store programs to be executed by the CPU 131 to control actions and operations in the MFP 10. The RAM 133 may serve as a storage area to store data and/or signals to be used in the programs and as a work area to process the data and/or the signals. The EEPROM 134 may store configuration information, which should be maintained to be used later even once the power supply to the power source 100 is shut off.

The EEPROM 134 may store time information, which indicates latest discharge time when the ink was discharged from the nozzles 40 most recently. The latest discharge time may indicate, for example, time when a latest flushing process was conducted, time when a latest recording process was conducted, and time when the ink was aspirated through the nozzles 40 by the pump 73 most recently. The controller 130 may obtain the time information from a system clock (not shown) when the ink is discharged from the nozzles 40 and store the obtained time information in the EEPROM 134. The controller 130 may, if older time information is already stored in the EEPROM 134 by the time when the controller 130 obtains new time information concerning the latest discharge time, write the newly obtained time information in the EEPROM 134 over the existing time information.

The ASIC 135 is connected with the feeder motor 101, the conveyer motor 102, and the carriage motor 103. The ASIC 135 may generate driving signals to rotate the feeder motor 101, the conveyer motor 102, and the carriage motor 103 and output the generated driving signals to the feeder motor 101, the conveyer motor 102, and the carriage motor 103. The feeder motor 101, the conveyer motor 102, and the carriage motor 103 may be rotated in the normal direction or the reverse direction according to the driving signals from the ASIC 135. The controller 130 may apply the driving voltages from the power source 110 to each of the driving devices in the recording head 39 through a driver IC, which is not shown, so that the ink droplets may be discharged through the nozzles 40 corresponding to the driving devices.

The ASIC 135 is connected with a communication interface, which enables communication between the MFP 10 and an external device (e.g., the information processing terminal 150). The communication interface includes the wired communication interface 51 and the wireless communication interface 52. The ASIC 135 may communicate with the information processing terminal 150 by wire (not shown) through the wired communication interface 51 and wirelessly through the wireless communication interface 52. In other words, the controller 130 may exchange information or data with the information processing terminal 150 through the communication interface. Optionally, one of the wired communication interface 51 and the wireless communication interface 52 may be omitted from the MFP 10.

The wired communication interface 51 may be, for example, a LAN interface or a USB interface, to which a LAN cable or a USB cable is attachable. The wireless communication interface 52 may be, for example, an antenna that may exchange wireless signals with the information processing terminal 150 in compliance with a Wi-Fi (registered trademark) protocol or an antenna that may exchange wireless signals in compliance with a Bluetooth (registered trademark) protocol. In FIG. 6, it may be noted that the information processing terminal 150, which is the external device outside the MFP 10, is enclosed in dotted rectangle in order to illustrate the wired and wireless communication between the ASIC 135 and the information processing terminal 150. The communication between the MFP 10 and the information processing terminal 150 may be indirect through an intermediate relaying apparatus (e.g., an access point, a router, or a hub) or may be direct without being relayed through the intermediate relaying apparatus.

The ASIC 135 is further connected with the registration sensor 120, the rotary encoder 121, the carriage sensor 38, the medium sensor 122, and the cap sensor 123. The controller 130 may detect a position of the sheet 12 based on the detection signals output from the registration sensor 120 and the pulse signals output from the rotary encoder 121. Further, the controller 130 may detect a position of the carriage 23 based on the pulse signals output from the carriage sensor 38. Moreover, the controller 130 may detect a position of the cap 71 based on the detection signals output from the cap sensor 123.

The controller 130 may detect presence of the sheet 12 being conveyed by the conveyer roller 54 and the ejection roller 55 based on the detection signals output from the medium sensor 122. In particular, the controller 130 may compare an amount of change in signal levels between chronologically adjoining two detection signals with a predetermined threshold value. The controller 130 may, based on the amount of change being greater than or equal to the threshold value, determine that a leading edge of the sheet 12 reached a position to vertically face the medium sensor 122.

[Information Processing Terminal 150]

The information processing terminal 150 includes, as shown in FIG. 7A, a display 153, a communication interface including a wired communication interface 155 and a wireless communication interface 156, a CPU 161, a memory 162, and a communication bus 163. The display 153, the wired communication interface 155, the wireless communication interface 156, the CPU 161, and the memory 162 are connected with one another through the communication bus 163. The information processing terminal 150 includes, for example, but is not limited to, a PC, a tablet terminal, a smartphone, and a mobile phone.

The display 153 may be, for example, a liquid crystal display, or an organic EL display, which has a displaying screen to display information and images thereon. The operation interface 154 may be a user interface, through which inputting operations by a user may be entered. For example, the operation interface 154 may include a keyboard, a mouse, and a touch-sensor laid over the display 153, or may be a combination of any of these.

The wired communication interface 155 enables wired communication between the information processing terminal 150 and the MFP 10. The wired communication interface 155 may be, for example, a LAN interface or a USB interface, to which a LAN cable or a USB cable is attachable. The wireless communication interface 156 enables wireless communication between the information processing terminal 150 and the MFP 10. The wireless communication interface 156 may be, for example, an antenna that may exchange wireless signals with the MFP 10 in compliance with a Wi-Fi (registered trademark) protocol or an antenna that may exchange wireless signals in compliance with a Bluetooth (registered trademark) protocol. Optionally, one of the wired communication interface 155 and the wireless communication interface 156 may be omitted from the information processing terminal 150.

The CPU 161 may control overall operations, actions and processes in the information processing terminal 150. The CPU 161 may read programs from the memory 162 and execute the programs based on information input through the operation interface 154 and/or received from an external device through the wired communication interface 155 or the wireless communication interface 156.

The memory 162 may store an operating system (OS) 164, an editor program 165, and a driver program 166. The memory 162 may further store data and information required to execute the editor program 165 and the driver program 166. The memory 162 may include, for example, a RAM, a ROM, an EEPROM, an HDD, and a combination of any of these.

The editor program 165 may edit contents data according to an operation by the user to the operation interface 154. The editor program 165 may, for example, as shown in FIG. 7B, display an image expressed in designated contents data in the display 153, receive user's operations to edit the contents data through the operation interface 154, and edit the contents data according to the received user's operations. The contents data may be provided in a number of types of formats, which include, for example, text format, image format, spreadsheet format, and presentation format.

The driver program 166 may control the MFP 10 to conduct a recording process according to a print instruction received from the editor program 165 through the OS 164. The driver program 166 may be a single program or an assembly of multiple programs. The driver program 166 defines multiple functions designated by the OS 164. The OS 164 may call and activate the multiple functions from the driver program 166 in a predetermined order so that the driver program 166 may control the MFP 10 to conduct the recording process.

The memory 162 may be a computer-readable storage medium, which is a non-transitory medium. The non-transitory medium may include a recording medium such as, for example, a CD-ROM and a DVD-ROM. The non-transitory medium may be a tangible medium. Meanwhile, electrical signals conveying a program that is downloadable through the internet, for example, from a server, may form a computer-readable signal medium but may not form a non-transitory computer-readable storage medium.

[Processes in Information Processing Terminal 150]

Processes in the information processing terminal 150 to control the MFP 10 to conduct the recording process will be described below with reference to FIG. 7B and FIG. 8A.

First, the editor program 165 in the information processing terminal 150 may display an editor screen as shown in FIG. 7B in the display 153. The editor screen may include a read-instruction icon 111, a save-instruction icon 112, a print-instruction icon 113, and an editable image 114. The read-instruction icon 111 corresponds to an instruction, by which the CPU 164 reads contents data stored in the memory 162. The save-instruction icon 112 corresponds to an instruction, by which the CPU 164 stores the contents data expressing the editable image 114 in the memory 162. The print-instruction icon 113 corresponds to an instruction, by which the CPU 164 controls the MFP 10 to conduct the recording process using the contents data. The editable image 114 represents an image expressed in the contents data. The editor program 165 may receive operations by the user to the editor screen through the operation interface 154.

The editor program 165 may display a list of contents data in a readable format in the display 153 in response to an operation by the user to appoint the read-instruction icon 111 through the operation interface 154. Thereafter, the editor program 165 may read the contents data appointed by the user through the operation interface 154 from the memory 162. Thereafter, the editor program 165 may display the editable image 114 expressed in the appointed contents data in the display 153. The editor program 165 may edit the contents data in response to an instructing operation by the user to edit the editable image 114 through the operation interface 154. The editor program 165 may store the edited contents data in the memory 162 in response to an instructing operation by the user to appoint the save-instruction icon 112 through the operation interface 154.

The editor program 165 may instruct the driver program 166 through the OS 164 to conduct a print-instructing process in response to an instructing operation by the user to appoint the print-instruction icon 113 through the operation interface 154. For example, the editor program 165 may execute an API to instruct the driver program 116 to conduct the print-instructing process. Arguments for the API may include, for example, data ID (e.g., a file name) to identify the contents data being edited and condition parameters indicating condition to conduct the recording process (e.g., a sheet size, image quality, etc.). In this regard, appointing the print-instruction icon 113 may be equal to a user's operation to appoint contents data to be processed in the recording process. The print-instructing process may be a process to instruct the MFP 10 to conduct the recording process with the contents data. In the following paragraphs, a print-instructing process <A> will be described with reference to FIG. 8A.

[Print-Instructing Process <A>]

First, the driver program 166 determines the communication interface, through which the information processing terminal 150 is connected with the MFP 10, between the wired communication interface 155 and the wireless communication interface 156. Connection between the communication interface and the MFP 10 is registered in advance in the memory 162. In response to a determination that the information processing terminal 150 is connected with the MFP 10 through the wired communication interface 155, in S11, the driver program 166 transmits a preceding command to the MFP 10 through the wired communication interface 155. On the other hand, if the driver program 166 determines that the information processing terminal 150 is connected with the MFP 10 through the wireless communication interface 156, in response to the determination, in S11, the driver program 166 transmits a preceding command to the MFP 10 through the wireless communication interface 156.

The preceding command may be a notice command to notify the MFP 10 of upcoming transmission of a record command, which will be described later in detail. The preceding command may include a parameter, which is in correlation with a receiving interval between receipt of the preceding command and receipt of the record command in the MFP 10. Another parameter including, for example, performance information indicating hardware performance of the information processing terminal 150 may be included in the preceding command. The performance information may indicate, for example, at least one of a version of the OS 164 installed in the information processing terminal 150, a clock frequency of the CPU 161 in the information processing terminal 150, and a size of a work area for the CPU 161 reserved in the memory 162 in the information processing terminal 150, e.g., a memory size of a DRAM attached to a memory slot in the memory 162.

The parameter may further include, for example, information indicating a quantity of the programs running in the information processing terminal 150. This is because performance of the CPU 161 to run the driver program 166 may depend on the quantity of the programs running in the information processing terminal 150.

Following the transmission of the preceding command, in S12, the driver program 166 starts generating a record command. In particular, the driver program 166 may rasterize the contents data identified by the data ID appointed by the argument for the API to generate raster data. Thereafter, based on the generated raster data and the condition parameter appointed by the argument for the API, the driver program 166 may generate a record command, which may include, for example, a feed command, a register command, one or more discharge command(s), one or more convey command(s), and an eject command.

A feed command may control the MFP 10 to feed a sheet 12, which is in one of the feeder trays 20A, 20B. A register command may control the MFP 10 to convey the sheet 12 to a position, in which an initial recordable area in the sheet 12 may face the recording head 39. A discharge command may indicate discharging timing for the recording head 39 to discharge ink droplets to form an image in the recordable area on the sheet 12 that faces the recording sheet 39. A convey command may control the MFP 10 to convey the sheet 12 to a position, in which a next recordable area in the sheet may face the recording head 39. An eject command may control the MFP 10 to eject the sheet 12 with the image recorded thereon to the ejection tray 21.

Following S12, in S13, in response to completion of generating the record command (S13: YES), in S14, the driver program 166 transmits the generated record command to the MFP 10 through the communication interface. In particular, the driver program 166 may transmit the feed command, the register command, the discharge command, the convey command, the discharge command, the convey command . . . , and the eject command, in the order being mentioned, to the MFP 10 through the communication interface. The communication interface to transmit the record command is the same communication interface used to transmit the preceding command in S11.

The record command may be transmitted to the MFP 10 without an additional command by the user through the operation interface 154 once the user appointed the print-instruction icon 113 through the editor screen. In this regard, appointing the print-instruction icon 113 may be regarded as the user's expression to command execution of the recording process to the MFP 10. Therefore, the driver program 166 may transmit the preceding command, generate the record command, and transmit the record command to the MFP 1 once the print-instruction icon 113 is appointed.

Meanwhile, generating the record command, in particular, the raster data, may require a certain length of time. Therefore, generating time to generate the record command may rely on the hardware performance of the information processing terminal 150. In particular, the generating time to generate a record command may tend to be longer when a level of the hardware performance of the information processing terminal 150 indicated by the performance information is lower (e.g., an earlier version of the OS 164, a lower clock frequency of the CPU 161, or a smaller size of the work area).

[Image Recording Process]

Next, an image recording process according to the present embodiment will be described with reference to FIGS. 9-11. The MFP 10 may start the image recording process in response to receiving a command from the information processing terminal 150 through one of the wired communication interface 51 and the wireless communication interface 52. At the beginning of the image recording process, the carriage 23 may be located at the maintenance position, the cap 71 may be located at the covering position, and the switcher 170 may be in the third mode. The steps in the image recording process described in the following paragraphs may be implemented by the CPU 131 running a program read from the ROM 132 or by a hardware circuit (not shown) mounted on the controller 130. An order to process the steps may not necessarily be fixed to the flow described below but may be modified within a scope of the present invention as set forth in the appended claims.

First, in S31, the controller 130 in the MFP 10 may receive either the preceding command or the record command from the information processing terminal 150 through the communication interface. If the received command is the preceding command, in response to receipt of the preceding command (S31: PRECEDING COMMAND), the controller 130 stores first interface information indicating the communication interface, through which the preceding command was received, in the memory 162. In particular, if the preceding command was received through the wired communication interface 51, a first value "wired" is set in the first interface information; and if the preceding command was received through the wireless communication interface 52, a second value "wireless" is set in the first interface information.

In S32, the controller 130 executes a flush condition determining process, in which an executing condition to execute a flushing process is determined. The executing condition to execute the flushing process may include, for example, a quantity of flushing shots, which may be a sum of ink droplets to be discharged from each nozzle 40 in a single flushing process. In other words, the quantity of flushing shots may be equal to an amount of the ink to be discharged from each nozzle 40 prior to the recording process. The executing condition to execute the flushing process may not necessarily be limited to the quantity of flushing shots but may include, for example, a carriage velocity, which is a moving velocity of the carriage 23 in a single flushing process, and an intensity of the driving voltage to drive the driving devices in the recording head 39 in a single flushing process. With reference to FIG. 10, described below will be the flush condition determining process.

[Flush Condition Determining Process]

The controller 130 obtains time information indicating the current time from the system clock. The controller 130 calculates an elapsed time T being a difference between the latest discharge time, which is indicated in the time information stored in the EEPROM 134, and the current time. In this regard, the elapsed time T indicates a length of time elapsed since the ink was discharged most recently from the nozzles 40 and until the preceding command was received. In S41, the controller 130 compares the elapsed time T with a threshold time $T_{th1}$. When the elapsed time T is longer than or equal to the threshold time $T_{th1}$ (S41: NO), in S42, the controller 130 compares the elapsed time T with a threshold time $T_{th2}$. The threshold times Tali, $T_{th2}$ are values prepared in advance and stored in the EEPROM 134. The threshold time Tali is shorter than the threshold time $T_{th2}$ ($T_{th1} < T_{th2}$).

In response to the result that the elapsed time T is shorter than the threshold time $T_{th1}$ (S41: YES), in S43, the controller 130 determines 50 as the quantity of flushing shots. In response to the result that the elapsed time T is longer than or equal to the threshold time $T_{th1}$ (S41: NO) and shorter than the threshold time $T_{th2}$ (S42: YES), in S44, the controller 130 determines 100 as the quantity of flushing shots. In response to the result that the elapsed time T is longer than or equal to the threshold time $T_{th2}$ (S42: NO), in S45, the controller 130 determines 500 as the quantity of flushing shots. In this regard, if the elapsed time T is longer, the quantity of flushing shots is increased to be larger. Additionally or alternatively, if the elapsed time T is longer, the carriage velocity may be reduced to be slower, and/or the driving voltage may be increased to be higher.

Following S43 or S44, in response to the determination of 50 (S43) or 100 (S44) as the quantity of flushing shots, in other words, in response to the elapsed time T being shorter than the threshold time $T_{th2}$, in S46 or in S47, the controller 130 executes a standby period determining process, in which a length of standby period may be determined based on a parameter. On the other hand, in response to the determination of 500 as the quantity of flushing shots (S45), in other words, in response to the elapsed time T being longer than or equal to the threshold time $T_{th2}$, in S48, the controller 130 determines 0 second as the standby period, which may be a shortest applicable standby period.

The standby period may mean a length of time between receipt of the preceding command and start of an uncapping process (S62) (see FIG. 12). With reference to FIG. 11, described below will be the standby period determining process.

[Standby Period Determining Process]

In S51, the controller 130 determines the value set in the first interface information. Following S51, in either S52 or S53, the controller 130 compares the level of the hardware performance of the information processing terminal 150 indicated in the performance information contained in the preceding command with a predetermined threshold value. Based on the determinations in S51-S53, in S54-S57, the controller 130 determines the length of the standby period among, for example, 0 second, 0.5 second, and 1 second. However, the lengths of the applicable standby period may not necessarily be limited to these. For example, the shortest standby period may not necessarily be limited to 0 but may be longer than 0.

In particular, in response to the determinations in S51 that the first interface information indicates the first value "wired" (S51: WIRED) and in S52 that the hardware performance is higher than or equal to the threshold value (S52: YES), in S54, the controller 130 determines 0 second as the standby period. In response to the determinations in S51 that the first interface information indicates the first value "wired" (S51: WIRED) and in S52 that the hardware performance is lower than the threshold value (S52: NO), in S55, the controller 130 determines 0.5 second as the standby period. In response to the determinations in S51 that the first interface information indicates the second value "wireless" (S51: WIRELESS) and in S53 that the hardware performance is higher than or equal to the threshold value (S53: YES), in S56, the controller 130 determines 0.5 second as the standby period. Moreover, in response to the determinations in S51 that the first interface information indicates the first value "wireless" (S51: WIRELESS) and in S53 that the hardware performance is lower than the threshold value (S53: NO), in S57, the controller 130 determines 1 second as the standby period. Thus, the lower the hardware performance indicates, the longer standby period the controller 130 determines; and the higher the hardware performance indicates, the shorter standby period the controller 130 determines.

A method to prepare the threshold value and the comparable hardware performance may not necessarily be limited, but the threshold value and the comparable hardware performance of the information processing terminal 150 may be prepared, for example, in the following method. That is, the controller 130 may set a value "5" to represent the hardware performance of the information processing terminal 150 if the version of the OS 164 in the performance information is higher than or equal to a predetermined threshold version. Further, if the clock frequency of the CPU 161 indicated in the performance information is 4 GHz, the controller 130 may add a value "4," which is the numeric figure removing the unit (GHz) indicating the substantive extent of the clock frequency, to the hardware performance of the information processing terminal 150. Moreover, if the size of the work area indicated in the performance information of the information processing terminal 150 is 2 Giga bytes, the controller 130 may add a value "2," which is the numeric figure removing the unit (Giga) indicating the substantive largeness of the work area, to the hardware performance.

In this regard, the hardware performance may be a numerical sum of the specification of the information processing terminal 150 indicated in the performance information. Methods to numerically express the items in the specification may not necessarily be limited to the method described above. For example, one of the items that tends to be affected more by the generating time to generate the raster data may be weighed more heavily, and another item that tends to be affected less by the generating time to generate the raster data may be weighed less heavily. Further, methods to calculate the hardware performance may not necessarily be limited to the method described above as long as the method may provide estimation for the length of time required by the information processing terminal 150 to generate the raster data.

For example, one or more of known performance evaluating technics, such as MIPS (million instructions per second), instruction mix, e.g., Gibson mix and commercial mix, benchmarks, and simulations, may be adopted. For example, the driver program 166 may adopt one or more of the known performance evaluating technics and express the evaluation result numerically to determine the level of the hardware performance. For another example, the driver program 166 may obtain an evaluation result achieved by the known performance evaluating technic from a server (not shown) and adopt the obtained evaluation result as the hardware performance.

The generating time to generate the raster data tends to be shorter when the hardware performance value is greater and longer when the hardware performance value is smaller. Meanwhile, the hardware performance of the communication interface indicated in the first interface information may not be directly affected by the length of the generating time of the raster data. In this regard, however, wired communication through the wireless communication interface 52 may experience communication overheads and retries due to communication failures more frequently than wired communication through the wired communication interface 51. Meanwhile, the record command tends to contain a larger volume of data than the preceding command. Therefore, the receiving interval between receipt of the preceding command and receipt of the record command through the wireless communication interface 52 may tend to be longer than the receiving interval between receipt of the preceding command and receipt of the record command through the wired communication interface 51.

In one of S54, S55, S56, and S57, the controller 130 activates a timer to monitor elapse of the standby period determined in one of S46, S47, and S48. Meanwhile, if the length of the standby period determined in S46, S47, or S48 is 0 second, the timer may be not necessarily be activated.

Returning to FIG. 9, in S33, the controller 130 conducts a first preparatory process, in which the printer 11 may be placed in an executable condition for the recording process. In this regard, the preceding command may be a command to activate the first preparatory process, through which the printer 11 may be placed in an executable condition for the recording process. The executable condition for the recording process may be, for example, a condition, in which an image in at least a predetermined level of quality is recordable. The first preparatory process may include, for example, as shown in FIGS. 12 and 13, a voltage-increasing process (S61), an uncapping process (S62), a first moving process (S63), and a drive-switching process (S64).

The voltage-increasing process (S61) includes an action to increase the driving voltage to be delivered to each device in the printer 11 to a target voltage value $V_T$ (e.g., 24V). The power source 110 may, for example, increase the voltage of the power supplied from the external power supplier to the target voltage value $V_T$ through a regulator circuit, which is not shown. Increasing the voltage in the power source 110 may mean, for example, storing electric charge in a capacitor device, such as a condenser, which is not shown. Once the substantial electric charge to bear the target voltage value $V_T$ is stored in the capacitor device, the regulator circuit may continuously apply voltage required to maintain the driving voltage to the capacitor device.

In this regard, however, acutely increased voltage from the capacitor device may cause unstable fluctuation in the driving voltage. Therefore, the controller 130 may need to gradually increase the voltage. For example, the driving voltage may be increased up to a checking voltage value $V_1$ under feedback control. In response to the driving voltage reaching the checking voltage value $V_1$, the controller 130 may increase under feedback control the driving voltage to a checking voltage value $V_2$. Thus, the driving voltage may be gradually increased step-by-step to prevent fluctuation of the driving voltage being increased. In this regard, the checking voltage value $V_1$ is smaller than the checking voltage value $V_2$, and the checking voltage value $V_2$ is smaller than the target voltage value $V_T$ ($V_1 < V_2 < \ldots < V_T$).

Optionally, the controller 130 may conduct the voltage-increasing process while the power source 110 is in a condition to apply the driving voltage to the recording head 39. The condition to apply the driving voltage to the recording head 39 may include a condition, in which the driving voltage being increased is applied to the vibrating devices in the recording head 39 while a switching device in a circuit between the power source 110 and the recording head 39 is conductive. In other words, the condition to apply the driving voltage to the recording head 39 may include a condition, in which ink droplets may be discharged from the nozzles 40 as soon as the driving voltage being increased reaches the target voltage value, e.g., 24V. Under this condition, fluctuation of the driving voltage being increased may be prevented even more effectively in the following reasons.

That is, in general, in a fluctuating waveform of a voltage being applied to a circuit, lengths of time to be taken in rise and fall in the waveform tend to be longer when the circuit contains a greater resistance component. In other words, the greater the resistance component is, in the smaller a fluctuation range per unit time the voltage may fluctuate. Meanwhile, circuits between the power source 110 and the vibrating devices in the recording head 39 contain resistance components such as a transistor being a part of the switching device and an output device to output the driving signals. In this regard, a voltage path between the power source 110 and the recording head 39 may form a single circuit, in which the fluctuation range of the voltage being increased may be smaller, compared to a configuration, in which the power source 110 forming a single circuit and the recording head 39 are separated.

Further, a controlling circuit in the recording head 39 with the vibrating devices may be regarded as a condenser having a predetermined level of electrostatic capacity. The condenser may repeat charging and discharging as the driving voltage being applied thereto fluctuates. As a result, high-frequency components in the voltage fluctuation may be eliminated, and the fluctuation of the voltage being increased may be reduced more effectively.

Moreover, the voltage-increasing process (S61) may be conducted generally when the MFP 10 is powered on and when the operable modes in the power source 110 are switched from the sleep mode to the driving mode. Therefore, if the driving voltage is already at the target voltage value $V_T$ after powering on the MFP 10 or switching the operable mode to the driving mode, the voltage-increasing process (S61) may be omitted.

The uncapping process (S62) being another one of the processes in the first preparatory process includes an action to move the cap 71 from the covering position to the separate position. Therefore, the controller 130 may control the feeder motor 101 to rotate for a predetermined rotation amount. As the rotating driving force of the feeder motor 101 is transmitted to the vertically-moving device 76 through the switcher 170 in the third mode, the cap 71 may be moved from the covering position to the separate position. Meanwhile, the detection signals output from the cap sensor 123 may shift from the higher-leveled signals to the lower-leveled signals during the uncapping process, i.e., after the cap 71 leaves the covering position and before the cap 71 reaches the separate position.

The first moving process (S63) being another one of the processes in the first preparatory process includes an action to move the carriage 23 to a flushing position, which is leftward with respect to the ink receiver 75, after the cap 71 is separated from the recording head 39. In particular, the controller 130 may move the carriage 23 at the maintenance position rightward and thereafter leftward to the flushing position. Optionally, in order to prevent menisci in the ink in the nozzles 40 of the recording head 39 from collapsing, the controller 130 may move the carriage 23 leftward at a lower velocity at the beginning of the first moving process in S63.

The drive-switching process (S64) being another one of the processes in the first preparatory process includes an action to switch the transmittable modes in the switcher 170 from the third mode to the first mode. In particular, the controller 130 may control both the feeder motor 101 and the conveyer motor 102 to rotate in the normal direction and then in the reverse direction sequentially. Thereby, interface pressure between the driving gear 172 and the driven gear 176 and interface pressure between the driving gear 173 and the driven gear 177 may dissolve so that the driving gear 172 and the driven gear 176 may be unmeshed smoothly, and the driving gear 173 and the driven gear 177 may be unmeshed smoothly. Further, the driving gear 172 may mesh with the driven gear 174 smoothly.

The controller 130 may, as shown in FIGS. 12 and 13, start the voltage-increasing process upon receiving the preceding command from the information processing terminal 150 regardless of the standby period determined in one of S46-S48. In the case where 0 second is determined as the standby period in one of S46-S48, the controller 130 may start the uncapping process in parallel with the voltage-increasing process, as shown in FIG. 12. On the other hand, in the case where a length longer than 0 second is determined as the standby period in one of S46-S48, the controller 130 may start the uncapping process in response to expiry of the timer activated in the flush condition determining process, as shown in FIG. 13. Therefore, the uncapping process may start later than the voltage-increasing process.

It may be noted that the timer may activate immediately after the determination of the standby period in one of S46, S47, S48; therefore, technically, the uncapping process may start after completion of S46, S47, S48 and after the standby period. However, a length of the time between receipt of the preceding command and activation of the timer may be negligibly short compared to the receiving interval between receipt of the preceding command and the record command in the MFP 10. In this respect, it may be regarded that the uncapping process starts when the standby period elapses since receipt of the preceding command.

The controller 130 may, further, start the first moving process and the drive-switching process when the level of the detection signals from the cap sensor 123 shifts from the higher level to the lower level. In other words, the controller 130 may start the first moving process and the drive-switching process later than the start of the uncapping process. The controller 130 may conduct the part of the first moving process to move the carriage 23 leftward in the lower velocity and the part of the first moving process to move the carriage 23 rightward from the maintenance position in parallel with the uncapping process. On the other hand, the controller 130 may conduct the part of the first moving process to move the carriage 23 leftward to the flushing position after completion of the uncapping process.

Returning to FIG. 9, another part of the image recording process will be described below. In S31, if the command received from the information processing terminal 150 through the communication interface in the MFP 10 is the record command, in response to receipt of the record command (S31: RECORD COMMAND), in S34, the controller 130 may determine whether the first preparatory process is completed. The communication interface to receive the record command is the same communication interface as the communication interface, through which the preceding command was received, i.e., either the wired communication interface 51 or the wireless communication interface 52. In this regard, the record command may be received before completion of the first preparatory process, as shown in FIG. 12, or may be received after completion of the first preparatory process, as shown in FIG. 13. In S34, in response to a determination that the first preparatory process is incomplete (S34: NO), the controller 130 waits for the first preparatory process to be completed before proceeding to steps onward.

In S34, in response to a determination that the first preparatory process is completed (S34: YES), in S35, the controller 130 conducts a second preparatory process. The second preparatory process, which includes processes to place the printer 11 in the executable condition for the recording process that are not included in the first preparatory process. The second preparatory process may include, for example, a flushing process (S71), a second moving process (S72), a feeding process (S73), and a registering process (S74), as shown in FIGS. 12 and 13.

The flushing process (S71) includes an action to control the recording head 39 to discharge ink droplets at the ink receiver 75 from the nozzles 40 while the carriage 23 is moved rightward in the second moving process. Therefore, the controller 130 may apply the driving voltage increased to the target voltage value $V_T$ in the voltage-increasing process (S61) to the driving devices corresponding to the respective nozzles 40 at predetermined timings set in advance on the nozzle 40 basis so that the quantity of shots of ink droplets determined in the flush condition determining process may be discharged from each one of the nozzles 40.

The discharging timing to discharge the ink droplets in the flushing process may be designed in advance so that the ink droplets may fall on the guide walls 75B, 75C. The discharging timing to discharge the ink droplets from each nozzle 40 may be regulated depending on the encoder values from the carriage sensor 38. For example, among 24 lines of nozzles 40, i.e., six lines of nozzles 40 for each of the black ink, the yellow ink, the cyan ink, and the magenta ink, the ink droplets may be discharged from the nozzles 40 in a rightmost nozzle line among the six lines of nozzles 40 for the black ink and the nozzles 40 in a rightmost nozzle line among the six lines of nozzles 40 for the cyan ink at first discharging timing. Thereafter, at second discharging timing, the ink droplets may be discharged from the nozzles 40 in a second nozzle line from the right among the six lines of nozzles 40 for the black ink and the nozzles 40 in a second nozzle line from the right among the six lines of nozzles 40 for the cyan ink. Thus, the nozzle lines to discharge the ink droplets may shift leftward line by line until the ink droplets are discharged from the nozzles 40 in a leftmost nozzle line among the six lines of nozzles 40 for the yellow ink and from the nozzles in a leftmost nozzle line among the six lines of nozzles 40 for the magenta ink. In other words, the controller 130 may control the recording head 39 to discharge the ink droplets from the lines of nozzles 40 in the aligning order of the nozzle lines along the main scanning direction, e.g., from right to left.

The second moving process (S72) being another one of the processes in the second preparatory process includes an action to move the carriage 23 rightward to a detectable position. In particular, the controller 130 may drive the carriage motor 103 to move the carriage 23 rightward to the detectable position. The detectable position, in which the carriage 23 may face the sheet 12 in any size (e.g., A4, B4, legal, 3.5*5, etc.) supportable by the feeder trays 20A, 20B, within the sheet-facing area. The detectable position may be at a center of the sheet-face area along the main scanning direction, when the feeder trays 20A, 20B support the sheet 12 at a center-aligned position in the main scanning direction.

The feeding process (S73) being another one of the processes in the second preparatory process includes an action to control the feeder 15A to feed the sheet 12 supported by the feeder tray 20A to a position to reach the conveyer roller 54. The feeding process may be conducted when the feed command designates the feeder tray 20A as a feed source to supply the sheet 12 in the conveyer path 65. In particular, the controller 130 may control the feeder motor 101 to rotate in the normal direction according to the feed command, and, after the level of the detection signals from the registration sensor 120 shifts from the lower level to the higher level, to rotate in the normal direction for a predetermined rotation amount. As the rotating driving force from the feeder motor 101 is transmitted to the feeder roller 25A through the switcher 170 in the first mode, the sheet 12 supported by the feeder tray 20A may be fed in the conveyer path 65.

The registering process (S74) being another one of the processes in the second preparatory process includes an action to control the conveyer roller 54 and the ejection roller 55 to convey the sheet 12, which reached the conveyer roller 54 in the feeding process, in the conveying orientation 16 to the position where the initial recordable area in the sheet 12 being fed may face the recording head 39. In particular, the controller 130 may control the conveyer motor 102 according to the register command to rotate the conveyer roller 54 and the ejection roller 55 in the normal direction until the initial recordable area in the sheet 12 reached the conveyer roller 54 faces the recording head 39. Meanwhile, the controller 130 may detect the leading edge of the sheet 12 through the medium sensor 122 during the registering process.

None of the actions in the processes S71-S74 may be started until at least one of the actions in the processes S61-64 is completed. In particular, the second moving process may not be started until the voltage-increasing process and the first moving process are both completed but may be started before completion of the drive-switching process. Meanwhile, the flushing process may not be started until the second moving process is started. Further, the feeding process may not be started until the drive-switching process is completed but may be started before completion of the voltage-increasing process or the first moving process. Moreover, the registering process may not be started before completion of the feeding process.

In other words, the controller 130 may start the second moving process in response to completion of the voltage-increasing process and the first moving process and may start the flushing process after starting the second moving process. Thus, the controller 130 may conduct the second moving process and the flushing process in parallel. Moreover, the controller 130 may start the feeding process in response to completion of the drive-switching process and, in response to completion of the feeding process, the controller 130 may start the registering process.

Meanwhile, although omitted from the accompanying drawings, if the feed command designates the feeder tray 20B as the feeder source of the sheet 12, the controller 130 may, in response to completion of the flushing process, switch the transmittable modes in the switcher 170 from the first mode to the second mode. In particular, the controller 130 may move the carriage 23 moving in the second moving process further rightward so that the lever 178 engaged with the first stopper may be moved to be engaged with the second stopper. Thereafter, in response to the transmittable mode in the switcher 170 being switched to the second mode, the controller 130 may move the carriage 23 leftward toward the detectable position. Moreover, in response to the transmittable mode in the switcher 170 being switched to the second mode, the controller 130 may start the feeding process to feed the sheet 12 supported by the feeder tray 20B in the conveyer path 65.

Returning to FIG. 9, a remaining part of the image recording process will be described below. The controller 130 may, in response to completion of all of the actions contained in the second preparatory process, conduct the recording process in S36-S39 in compliance with the record command received in S31. The recording process may include, for example, a discharging process (S36) and a conveying process (S38), which may be repeated alternately, and an ejecting process (S39). The discharging process (S39) includes an action to control the recording head 39 to discharge the ink droplets at the recordable area in the sheet 12 facing the recording head 39. The conveying process (S38) includes an action to control the conveyer roller 54 to convey the sheet 12 for a predetermined distance in the conveying orientation 16. The ejecting process (S39) includes an action to control the ejection roller 55 to eject the sheet 12 with the image recorded thereon at the ejection tray 21.

In particular, in S36, the controller 130 moves the carriage 23 from one end to the other end of the sheet-facing area and control the recording head 39 to discharge ink droplets according to the discharge command. In S37, the controller 130 determines whether there remains unrecorded image, which is to be recorded in the recordable area in the sheet 12. In response to a determination that there remains the unrecorded image for another recordable area in the sheet 12 (S37: NO), in S38, the controller 130 controls the conveyer roller 54 to convey the sheet 12 to a position, in which a next recordable area in the sheet 12 may face the recording head 39. S37-S38 may be repeated until a determination that there remains no unrecorded image for another recordable area in the sheet 12 is made. In S37, in response to a determination that there remains unrecorded image (S37: YES), in S39, the controller 130 may control the ejection roller 55 to eject the sheet 12 at the ejection tray 21 in compliance with the ejection command.

Although not shown in the accompanying drawings, in response to completion of the recording process (S36-S39), the controller 130 may move the carriage 23 to the maintenance position, switch the transmittable mode in the switcher 170 to the third mode, and move the cap 71 to the covering position. Further, in response to elapse of a predetermined length of time since the cap 71 moved to the covering position, the controller 130 may switch the operable modes of the power source 110 from the driving mode to the sleep mode.

[Benefits]

According to the embodiment described above, the uncapping process may be conducted after passage of the standby period, which is determined according to the receiving interval between the preceding command and the record command; therefore, a length of time between the uncapping process and the flushing process, i.e., a length of time in which the nozzles 40 may be exposed uncovered, may be restrained from being prolonged unnecessarily. Further, compared to a configuration, in which the uncapping process is conducted after receiving the record command, a length of FPOT may be reduced. In other words, while the image recording quality may be restrained from lowering, the FPOT may be shortened.

The voltage-increasing process may be one of the most time-consuming preparatory process in the plurality of preparatory processes to be conducted by the MFP 10. Meanwhile, the timing to conduct the voltage-increasing process may not affect the image recording quality. Therefore, as described in the embodiment above, the voltage-increasing process may be started as soon as the preceding command is received so that the image recording quality may be restrained from lowering, and the EPOT may be shortened.

According to the embodiment described above, the flushing process may be conducted immediately before conducting the recording process, i.e., after receipt of the record command. Therefore, the image recording quality may be restrained from lowering more effectively. Further, the length of time between the uncapping process and the flushing process, i.e., the length of time in which the nozzles 40 may be exposed uncovered, may be shortened. Therefore, an amount of the ink to be used in the flushing process may be reduced, and the ink to be used in the recording process may be saved.

In this regard, however, the amount of the ink to be used in the shortened flushing process may be reduced. Therefore, the small difference in the lengths of time to expose the nozzles 40 uncovered may affect the image recording quality largely. In this regard, as described in the above embodiment, if the time elapsed since the latest discharge time is shorter, it may be preferable that the length of time to expose the nozzle 40 may be reduced by conducting the uncapping process after the elapse of the standby period determined based on the parameter. On the other hand, if the time elapsed since the latest discharge time is longer, the amount of the ink to be discharged in the flushing process may be increased. In this regard, the difference in the lengths of time to maintain the nozzles 40 exposed may affect the image recording quality to a relatively smaller extent. Therefore, as described in the above embodiment, if the elapsed time since the latest discharge time is longer, it may be preferable that the FPOT is reduced by reducing the standby period to the shortest length.

According to the embodiment described above, the length of the standby period is determined depending on the performance information and the first interface information. Thus, a preferable length of standby period may be determined by combining the plurality of parameters in different aspects. It may be noted that the parameters, or the combination of the parameters, to be used to determine the length of the standby may not necessarily be limited to the performance information and the first interface information. The parameters to be used to determine the length of the standby period may include, for example, characteristic information and second interface information, which are described below, contained in the preceding command.

The characteristic information is a parameter indicating a characteristic of the contents data to be processed in the recording process. The characteristic information may indicate, for example, at least one of a data format (e.g., document, image, etc.,) of the contents data, which may be expressed in an extension, a data size of the contents data, and a resolution of the contents data. The generating time to generate a record command may vary depending on the characteristics of the contents data indicated in the characteristic information. For example, contents data in an image format may take longer time to generate raster data to be contained in the record command compared to contents data in a document format. For another example, contents data in a certain data format (e.g., PDF format) may need to be converted into another format through a server in the internet in order to generate a record command. Meanwhile, contents data in a larger data size and contents data in a higher resolution tend to require longer time to generate raster data.

The second interface information may be a parameter indicating a communication interface of the information processing terminal 150 that transmits the preceding command. In other words, the second interface information may be a parameter indicating either one of the wired communication interface 155 and the wireless communication interface 156. For example, the second interface information may indicate a first value "wired" if the information processing terminal 150 transmitted the preceding command through the wired communication interface 155 and may indicate a second value "wireless" if the information processing terminal 150 transmitted the preceding command through the wireless communication interface 156. A receiving interval between receipt of the preceding command and receipt of the record command transmitted through the wireless communication interface 156 may tend to be longer than the receiving interval between the preceding command and the record command transmitted through the wired communication interface 155.

In this regard, in communication between the MFP 10 and the information processing terminal 150 through a communication network, the first interface information may indicate a communication protocol between the MFP 10 and a closest intermediate relaying device, and the second interface information may indicate a communication protocol between the information processing terminal 150 and a closest intermediate relaying device. Therefore, the length of the standby period may be determined based on a combination of the first interface information and the second interface information. In other words, within a communication path between the MFP 10 and the information processing terminal 150, a wired communication section and a wireless communication section may be contained, and the controller 130 may shorten the standby period when the wired communication section is relatively long.

For example, if the first value "wired" is set both in the first interface information and the second interface information, the controller 103 may determine a first length as the standby period. If the first value "wired" is set in one of the first interface information and the second value "wireless" is set in the other of the first interface information and the second interface information, the controller 130 may determine a second length, which is longer than the first length, as the standby period. If the second value "wireless" is set both in the first interface information and the second interface information, the controller 103 may determine a third length, which is longer than the second length, as the standby period.

Modified Example

Although an examples of carrying out the invention has been described, those skilled in the art will appreciate that there are numerous variations and permutations of the inkjet recording apparatus, the computer-readable storage medium, and the recordable system that fall within the spirit and scope of the invention as set forth in the appended claims.

For example, the standby period determining process (see FIG. 8A) may not necessarily be conducted by the controller 130 in the MFP 10, which receives the preceding command and the record command, but may be conducted by the information processing terminal 150, which transmits the preceding command and the record command. In the following paragraphs, described will be a print instructing process <B> to be conducted by the driver program 166 in the information processing terminal 150 with reference to FIG. 8B. In the following paragraphs, steps, instructions, processes, and actions that are identical or substantially similar to those described in the print instructing process <A> (see FIG. 8A) will be omitted.

[Print Instructing Process <B>]

In S21, in response to an instruction given by the editor program 165 through the OS 164 to conduct the print instructing process <B>, the driver program 166 conducts a standby period determining process. The process in S21 is substantially similar to the standby period determining process shown in FIG. 11, except that the first interface information is not used as the parameter. The driver program 166 activates a timer to monitor elapse of the standby period determined in S21. In S22, the driver program 166 starts generating a record command. The process in S22 may be conducted in the same manner as S12 in the print instructing process <A>.

In S23, in response to expiry of the timer, i.e., elapse of the standby period, while generating the record command (S23: YES), in S24, the driver program 166 transmits the preceding command to the MFP 10 through the communication interface. In this regard, the standby period may be a time period between the user's input to instruct the information processing terminal 150 to conduct the recording process, or start of generating the record command, and transmission of the preceding command. The process in S24 may be conducted in the same manner as S11 in the print instructing process <A> except that the preceding command may not contain a parameter.

In S25, in response to completion of transmitting the preceding command and generating the record command (S25: YES), in S26, the driver program 166 transmits the record command to the MFP 10 through the communication interface. The process in S26 may be conducted in the same manner as S14 in the print instructing process <A>.

According to the modified example described above, the timing to transmit the preceding command may be adjusted depending on the receiving interval between the preceding command and the record command in the MFP 10. Therefore, the MFP 10 may start the first preparatory process upon receipt of the preceding command regardless of the length of the receiving interval between the preceding command and the record command. In this regard, the MFP 10, which receives the preceding command from the driver program 166 according to the print instructing process <B>, may omit the standby period determining process in S46-S48 and start the voltage-increasing process and the uncapping process simultaneously, as shown in FIG. 12.

The driver program 166 to conduct the print instructing process <B> may instruct not only the inkjet recording apparatus but also a laser printer, which may record an image on a sheet in an electro-photographic technic, to conduct the recording process. The laser printer may need to conduct a preparatory process, including heating a fuser, prior to conducting the recording process. In this regard, the laser printer may conduct the heating action upon receipt of the preceding command and the recording process upon receipt of the record command so that the FPOT may be shortened effectively.

Meanwhile, if the receiving interval between the preceding command and the record command is prolonged, the laser printer may need to continue heating the fuser even after the temperature in the fuser reached a required temperature in order to maintain the required temperature. In this regard, the fuser may be damaged by the excessive heat, or the power consumption to the laser printer may be increased. In this regard, it may be preferable that the preceding command is transmitted at the timing depending on the receiving interval between the preceding command and the record command in the laser printer, as shown in FIG. 8B.

More Examples

For further example, the feeder rollers 25A, 25B, the vertically-moving device 76 for the cap 71, the conveyer roller 60, the ejection roller 62, and the pump 73 may not necessarily be driven by two motors, which are the feeder motor 101 and the conveyer motor 102. That is, the feeder motor 101 may be omitted, while the conveyer motor 102 may drive the feeder rollers 25A, 25B, the vertically-moving device for the cap 71, the conveyer roller 60, the ejection roller 62, and the pump 73.

For another example, the recording head 39 to discharge the ink droplets may not necessarily be movable along with the carriage 23 moving in the main-scanning direction. That is, the recording head may be a known line head, in which the nozzles 40 are arranged entirely in the sheet-face area.

What is claimed is:

1. An inkjet recording apparatus, comprising:
   a recording head comprising a nozzle for discharging ink;
   a cap configured to cover the nozzle;
   a moving mechanism configured to move at least one of the recording head and the cap to shift positional relation between the recording head and the cap, between a covered state, in which the nozzle is covered by the cap contacting the recording head, and a separated state, in which the recording head and the cap are separated from each other;
   a communication interface; and
   a controller configured to:
      in response to receipt of a preceding command notifying upcoming transmission of a record command, the record command being an instruction to the inkjet recording apparatus to record an image on a medium, from an information processing terminal through the communication interface, determine a standby period based on a parameter being in correlation with a receiving interval between receipt of the preceding command and receipt of the record command;
      in response to elapse of the determined standby period, control the moving mechanism to uncap the recording head by shifting the positional relation between the recording head and the cap from the covered state to the separated state; and
      in response to receipt of the record command notified in the preceding command from the information processing terminal through the communication interface, and in response to completion of the uncapping, control the recording head in accordance with the record command to discharge the ink from the nozzle to record the image on the medium.

2. The inkjet recording apparatus according to claim 1, wherein the communication interface includes:
   a wired communication interface configured to communicate with the information processing terminal through a cable; and
   a wireless communication interface configured to wirelessly communicate with the information processing terminal,
   wherein the controller determines the communication interface, through which the preceding command was received, between the wired communication interface and the wireless communication interface, as the parameter to be based on to determine the standby period,
   wherein, in response to a determination that the preceding command was received through the wired communication interface, the controller determines a first period as the standby period, and
   wherein, in response to a determination that the preceding command was received through the wireless communication interface, the controller determines a second period being longer than the first period as the standby period.

3. The inkjet recording apparatus according to claim 1, wherein the communication interface includes:
   a wired communication interface configured to communicate with the information processing terminal through a cable; and
   a wireless communication interface configured to wirelessly communicate with the information processing terminal,
wherein the controller determines the communication interface, through which the preceding command was received, between the wired communication interface and the wireless communication interface, as the parameter to be based on to determine the standby period,
wherein the preceding command includes performance information indicating hardware performance of the information processing terminal as the parameter, and
wherein the controller determines whether the hardware performance indicated in the performance information is one of higher than or equal to a threshold level and lower than the threshold level and determines:
   a first period as the standby period in response to determinations that the preceding command was received through the wired communication interface and that the hardware performance is higher than or equal to the threshold level;
   a second period, being longer than the first period, as the standby period in response to determinations that the preceding command was received through the wired communication interface and that the hardware performance is lower than the threshold level;
   the second period as the standby period in response to determinations that the preceding command was received through the wireless communication interface and that the hardware performance is higher than or equal to the threshold level; and
   a third period being longer than the second period as the standby period in response to determinations that the preceding command was received through the wireless communication interface and that the hardware performance is lower than the threshold level.

4. The inkjet recording apparatus according to claim 1, wherein the preceding command includes performance information indicating hardware performance of the information processing terminal as the parameter, and
wherein the controller is configured to:
   if the performance information indicates a first level of the hardware performance of the information processing terminal, determine a first standby period as the standby period; and
   if the performance information indicates a second level of the hardware performance of the information processing terminal, the second level being lower than the first level, determine a second standby period being longer than the first standby period as the standby period.

5. The inkjet recording apparatus according to claim 4, wherein the performance information includes at least one of:
   first information indicating at least one of a version of an OS installed in the information processing terminal, a clock frequency of a CPU in the information processing terminal, and a size of a work area for the CPU reserved in a memory in the information processing terminal; and
   second information numerically expressing the first information.

6. The inkjet recording apparatus according to claim 1, wherein the preceding command includes characteristic information indicating characteristics of image data, the image data expressing the image to be recorded on the medium,
wherein the controller requires generating time to generate the record command from the image data, a length of the generating time varying depending on the characteristics of the image data, and
wherein the controller determines the standby period to be longer as the generating time is longer and the standby period to be shorter as the generating time is shorter.

7. The inkjet recording apparatus according to claim 6, wherein the characteristic information indicates at least one of a data format of the image data, a data size of the image data, and a resolution of the image data.

8. The inkjet recording apparatus according to claim 1, wherein the recording head comprises a drive element for discharging the ink from the nozzle,
wherein the inkjet recording apparatus further comprises a power source configured to apply a driving voltage to the driving element, and
wherein the controller starts increasing the driving voltage from the power source to a target voltage value in response to receipt of the preceding command regardless of a length of the determined standby period.

9. The inkjet recording apparatus according to claim 8, further comprising:
   an ink receiver configured to receive the ink discharged from the nozzle of the recording head,
wherein the controller controls the recording head to discharge the ink from the nozzle toward the ink receiver in response to receipt of the record command and in response to completion of the increase of the driving voltage and completion of the uncapping.

10. The inkjet recording apparatus according to claim 9, wherein the controller controls the recording head to discharge a larger amount of the ink from the nozzle toward the ink receiver in response to an elapsed time period since the ink was discharged from the nozzle most recently being longer and a smaller amount of the ink from the nozzle toward the ink receiver in response to the elapsed time period being shorter,
wherein, in response to the elapsed time period being shorter than a threshold length, the controller determines the standby period based on the parameter, and
wherein, in response to the elapsed time period being longer than or equal to the threshold length, the controller determines a shortest applicable period as the standby period.

* * * * *